(12) United States Patent
Hamza et al.

(10) Patent No.: US 11,568,573 B2
(45) Date of Patent: Jan. 31, 2023

(54) METHODS AND APPARATUS FOR POINT CLOUD COMPRESSION BITSTREAM FORMAT

(71) Applicant: VID SCALE, INC., Wilmington, DE (US)

(72) Inventors: Ahmed Hamza, Montreal (CA); Yong He, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 0 days.

(21) Appl. No.: 17/277,064

(22) PCT Filed: Sep. 11, 2019

(86) PCT No.: PCT/US2019/050541
§ 371 (c)(1),
(2) Date: Mar. 17, 2021

(87) PCT Pub. No.: WO2020/060813
PCT Pub. Date: Mar. 26, 2020

(65) Prior Publication Data
US 2022/0051443 A1 Feb. 17, 2022

Related U.S. Application Data

(60) Provisional application No. 62/820,026, filed on Mar. 18, 2019, provisional application No. 62/732,774, filed on Sep. 18, 2018.

(51) Int. Cl.
*G06T 9/00* (2006.01)
*H04N 19/44* (2014.01)
(Continued)

(52) U.S. Cl.
CPC ............... *G06T 9/00* (2013.01); *H04N 19/44* (2014.11); *H04N 19/70* (2014.11); *G06T 15/00* (2013.01); *G06T 15/08* (2013.01); *G06T 15/10* (2013.01)

(58) Field of Classification Search
CPC ........... G06T 9/00; G06T 15/00; G06T 15/08; G06T 15/10; H04N 19/44; H04N 19/70
See application file for complete search history.

(56) References Cited

U.S. PATENT DOCUMENTS 11,095,908 B2 * 8/2021 Dawar .................... G06T 9/001
11,132,818 B2 * 9/2021 Mammou ................. G06T 9/00
(Continued)

OTHER PUBLICATIONS

PCC Category 2 bitstream structure using ISOBMFF movie fragment, m43622, MPEG 123; Ljubljana, Slovenia, Jul. 2018.
(Continued)

*Primary Examiner* — Richard T Torrente
(74) *Attorney, Agent, or Firm* — Flaster Greenberg, P.C.

(57) ABSTRACT

Methods, apparatus, systems, architectures and interfaces for encoding and/or decoding point cloud bitstreams including coded point cloud sequences are provided. Included among such methods, apparatuses, systems, architectures, and interfaces is an apparatus that may include a processor and memory. A method may include any of: mapping components of the point cloud bitstream into tracks; generating information identifying any of geometry streams or texture streams according to the mapping of the components; generating information associated with layers corresponding to respective geometry component streams; and generating information indicating operation points associated with the point cloud bitstream.

19 Claims, 14 Drawing Sheets

(51) Int. Cl.
*H04N 19/70* (2014.01)
*G06T 15/00* (2011.01)
*G06T 15/08* (2011.01)
*G06T 15/10* (2011.01)

(56) References Cited

U.S. PATENT DOCUMENTS

| | | | |
|---|---|---|---|
| 11,138,762 B2 * | 10/2021 | Sinharoy | G06T 17/20 |
| 2021/0152808 A1 * | 5/2021 | He | H04N 21/816 |
| 2021/0235056 A1 * | 7/2021 | Takahashi | H04N 21/845 |

OTHER PUBLICATIONS

Information technology—Coding of audio-visual objects—Part 15: Carriage of network abstraction layer (NAL) unit structured video in the ISO base media file format, ISO/IEC 14496-15:2021(E), 282 pages.

Mammou et al., Study Text of ISO/IEC CD 23090 5: video-based Point Cloud Compression, ISO/IEC JTC1/SC29/WG11 N18180, Jan. 2019, Marrakesh, Morocco, 103 pages.

Coding of audio-visual objects, Part 15: Carriage of network abstraction layer (NAL) unit structured video in the ISO base media file format, Reference No. ISO/IEC 14496-15:2017(E); Fourth edition, Feb. 2017.

Aksu, Emre B., (Nokia) et al.; "[PCC] On high level syntax of PCC", MPEG Meeting, Motion Picture Expert Group or ISO/IEC JTC1/SC29/WG11, No. M43580, Jul. 11, 2018, Ljubljana, Slovenia, 4 pages.

"Information technology—Coding of audio-visual objects", Part 12: ISO base media file format, ISO/IEC 14496-12 4th edition 2012.

Takahashi, Ryohei (Sony), et al.,: "Clarification on PCC category 2 bitstream from system technology aspect", MPEG Meeting, Motion Picture Expert Group or ISO/IEC JTC1/SC29/WG11, No. m43491, Jul. 11, 2018, 2 pages.

Hamza, Ahmed (Interdigital), et al.,: "Update to Questions Related to V-PCC File Format Design", MPEG Meeting, Motion Picture Expert Group or ISO/IEC JTC1/SC29/WG11, No. m49118, Jul. 7, 2019, Gothenburg, SE, 5 pages.

"Working draft of Point Cloud Coding for Category 2 (Draft 1)", ISO/IEC JTC1/SC29/WG11, MPEG 2018, No. 17534, Apr. 2018, San Diego, US, 33 pages.

Yip, Eric, (Samsung) et al.,: "WD of Storage of V-PCC in ISOBMFF Files", MPEG Meeting, Motion Picture Expert Group or ISO/IEC JTC1/SC29/WG11 MPEG2018, No. m45204,Oct. 11, 2018, Macau, Macao S.A.R., China, 7 pages.

CE2.10 on PCC Metadata, m43720, MPEG 123; Ljubljana, Slovenia, Jul. 2018.

Coding of audio-visual objects, Part 12: ISO base media file format, , Dec. 15, 2015, 248 pages.

Hamza. Ahmed, (Interdigital) et al.,: "On Carriage of V-PCC Layers in ISOBMFF", MPEG Meeting, Motion Picture Expert Group or ISO/IEC JTC1/SC29/WG11, No. m49105, Jul. 3, 2019, Gothenburg, SE, 4 pages.

"First idea on Systems technologies for Point Cloud Coding"; ISO/IEC JTC1/SC29/WG11; MPEG2018, No. N17675; Apr. 2018, San Diego.

Use Cases for Point Cloud Compression (PCC), N16331, MPEG 115, Jun. 2016.

Hannuksela, Miska (Nokia), et al.: "The stream access-point sample grouping", ISO/IEC JTC1/SC29/WG11, MPEG2014, No. M33155, Mar. 2014, Valencia, Spain, 4 pages.

* cited by examiner

METHODS AND APPARATUS FOR POINT CLOUD COMPRESSION BITSTREAM FORMAT

CROSS REFERENCE TO RELATED APPLICATIONS

This application is the National Stage entry under 35 U.S.C. § 371 of Patent Cooperation Treaty Application PCT/US2019/050541, filed 11 Sep. 2019 and claims the benefit of U.S. Provisional Application No. 62/732,774, filed 18 Sep. 2018 and U.S. Provisional Application No. 62/820,026 filed 18 Mar. 2019, the contents of each of which are incorporated by reference herein.

BACKGROUND

The below generally relates to communication networks, wireless and/or wired. For example, one or more embodiments disclosed herein are related to methods and apparatus for decoding information associated with three-dimensional (3D) point clouds that may be transmitted and/or received using wireless and/or wired communication networks. 3D point clouds may provide a representation of physical space, virtual space, and/or immersive media. For example, a point cloud may be a set of points representing 3D space using coordinates indicating locations of each point along with one or more attributes, such as any of a color, transparency, time of acquisition, reflectance of laser or material property, etc., associated with one or more of the points. Point clouds may be captured in a number of ways. A point cloud may be captured using any of multiple cameras and depth sensors, such as, for example, light detection and ranging (LiDAR) laser scanners. In order to represent a 3D space, the number of points to (e.g., realistically) reconstruct objects and scenes using point clouds may be in the order of millions or billions, and may be a further increasing number. Such a large number of points of a point cloud may need efficient representation and compression for storage and transmission of point cloud data, and, for example, may be applied to advances in capturing and rendering 3D points used in the areas of tele-presence, virtual reality, and large-scale dynamic 3D maps, etc.

BRIEF DESCRIPTION OF THE DRAWINGS

A more detailed understanding may be had from the detailed description below, given by way of example in conjunction with the drawings appended hereto. Figures in the description, are examples. As such, the Figures and the detailed description are not to be considered limiting, and other equally effective examples are possible and likely. Furthermore, like reference numerals in the figures indicate like elements, and wherein.

DETAILED DESCRIPTION

Exemplary Networks and Devices

Figure 1A:
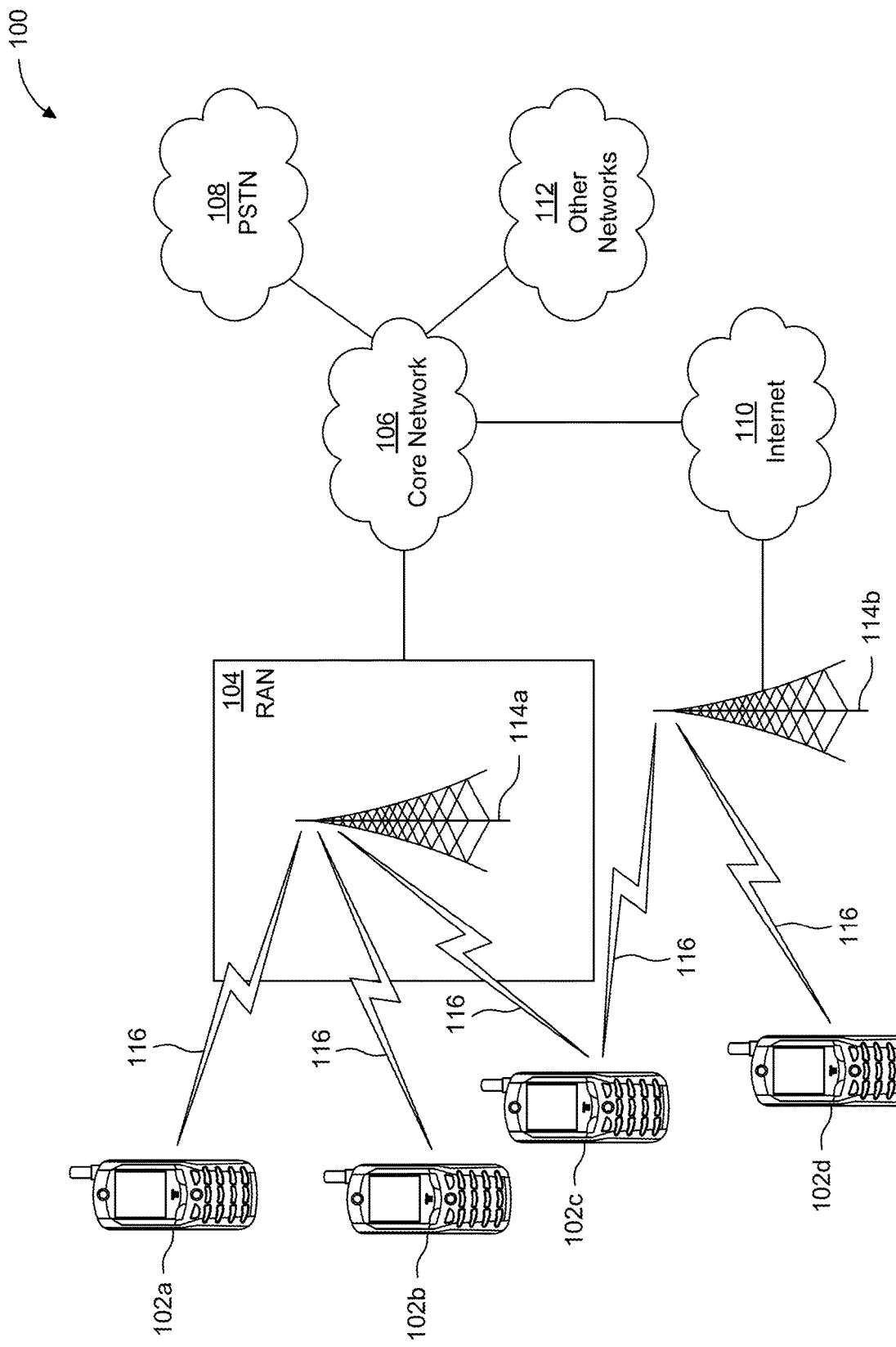
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
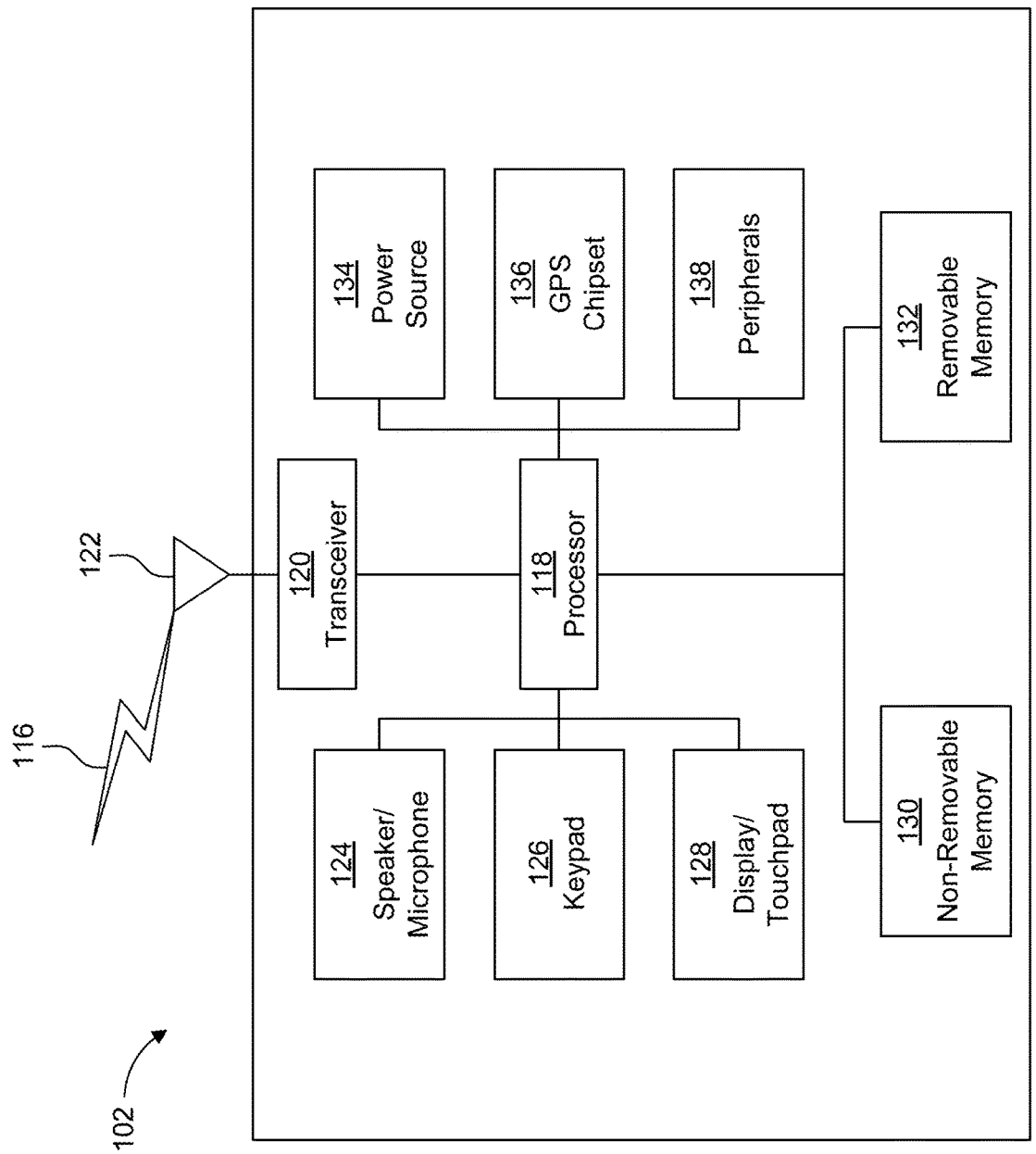
FIG. 1B is a system diagram illustrating an example wireless transmit/receive unit (WTRU) that may be used within the communications system illustrated in FIG. 1A according to embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
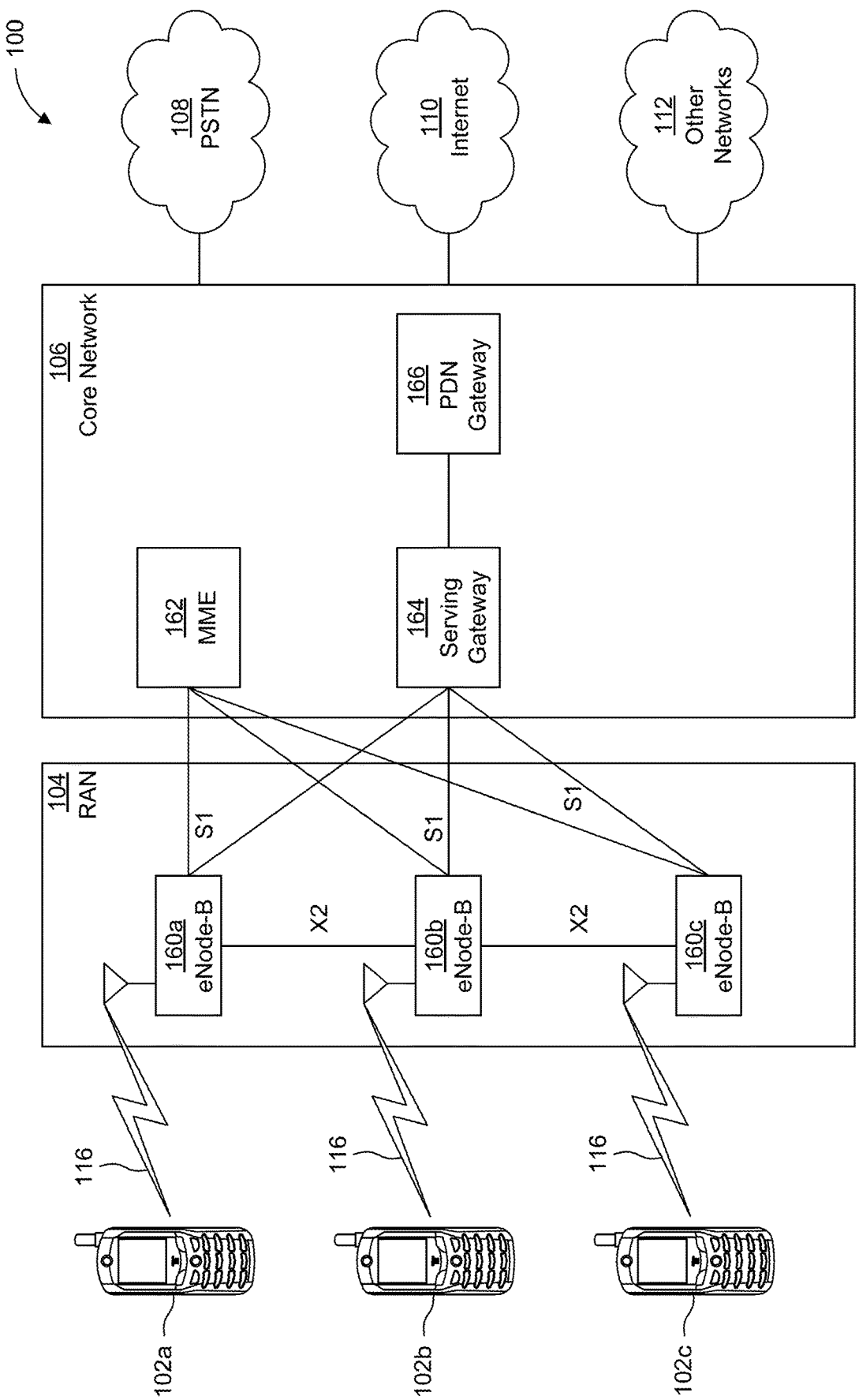
FIG. 1C is a system diagram illustrating an example radio access network (RAN) and an example core network (CN) that may be used within the communications system illustrated in FIG. 1A according to embodiments.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In some representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
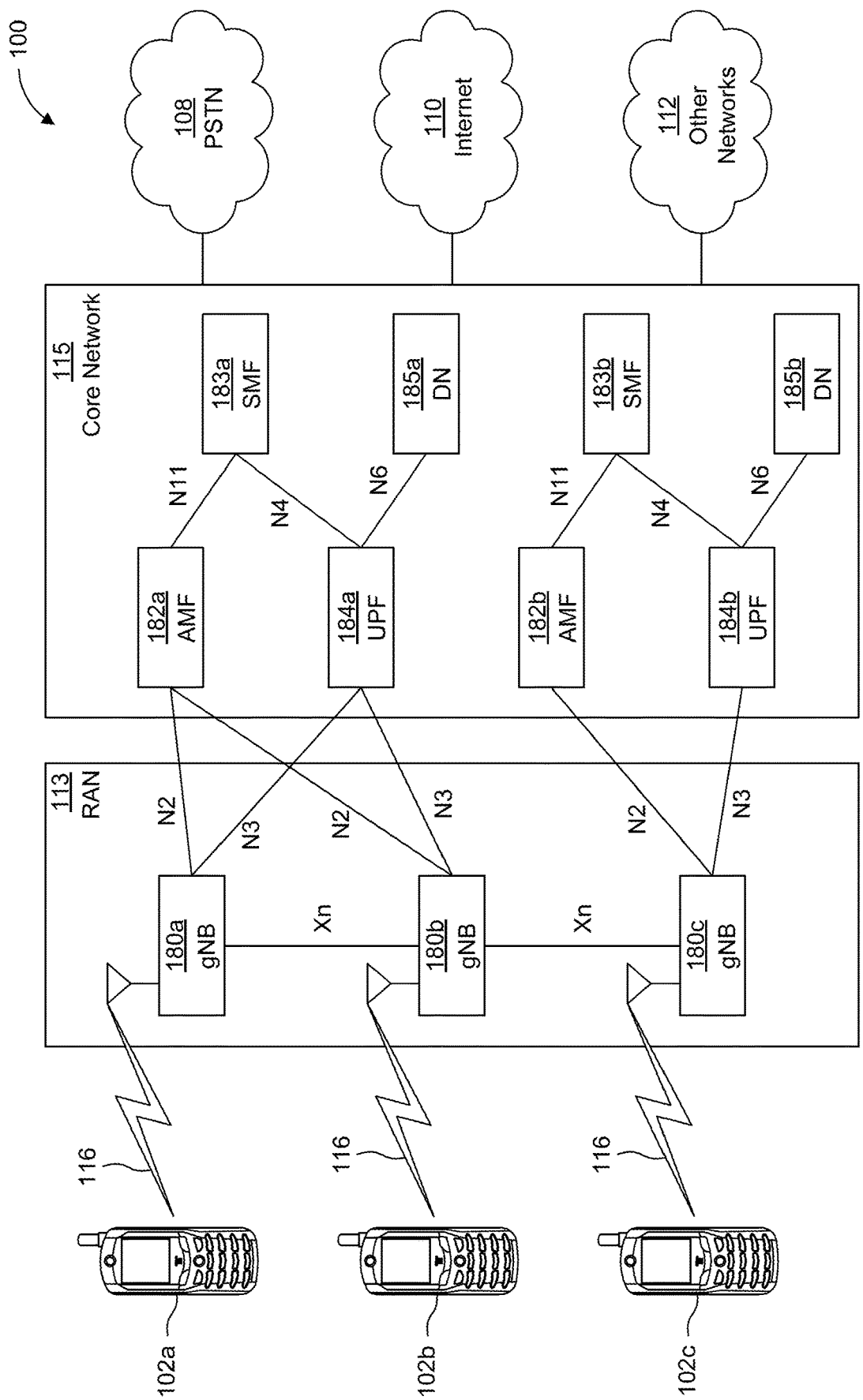
FIG. 1D is a system diagram illustrating a further example RAN and a further example CN that may be used within the communications system illustrated in FIG. 1A according to embodiments.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating a WTRU or UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular, satellite or other wireless radio telephones, and the like. Many digital video devices implement video compression techniques, such as those described in the standards defined by Moving Picture Experts Group (MPEG), such as MPEG-2, MPEG-4; and International Telecommunications Union (ITU), such as ITU-T H.263 or ITU-T H.264/MPEG-4, Part 10, Advanced Video Coding (AVC), and extensions of such standards, to transmit and receive digital video information, including information associated with three-dimensional (3D) point clouds, more efficiently.

Figure 2:
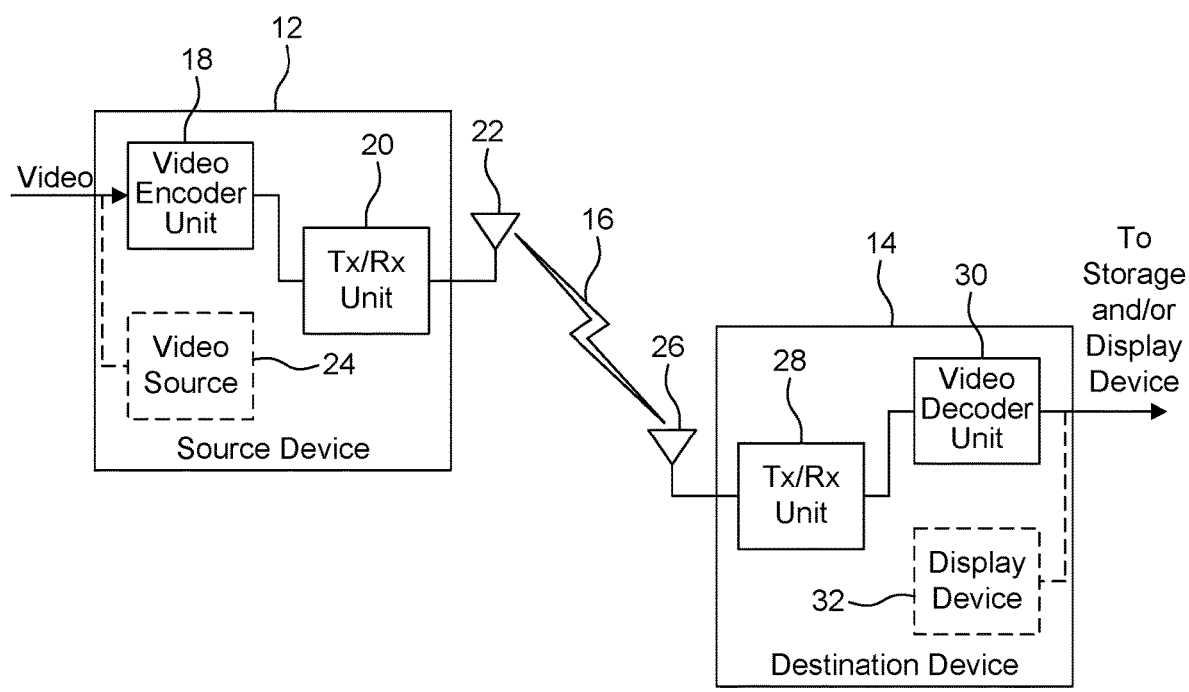
FIG. 2 is a block diagram illustrating an example video encoding and decoding system in which one or more embodiments may be carried out and/or implemented.

FIG. 2 is a block diagram illustrating an example video encoding and decoding system 10 in which one or more embodiments may be carried out and/or implemented. The system 10 may include a source device 12 that transmits encoded video information to a destination device 14 via a communication channel 16.

The source device 12 and destination device 14 may be any of a wide range of devices. In some embodiments, the source device 12 and the destination device 14 may include wireless transmit and/or receive units (WTRUs), such as wireless handsets or any wireless devices that can communicate video information over the communication channel 16, in which case, communication channel 16 includes a wireless link. The methods, apparatuses and systems described, disclosed or otherwise provided explicitly, implicitly and/or inherently (collectively "provided") herein, however, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, the communication channel 16 may include and/or may be any combination of wireless or wired media suitable for transmission of encoded video data.

The source device 12 may include a video encoder unit 18, a transmit and/or receive (Tx/Rx) unit 20 and a Tx/Rx element 22. As shown, the source device 12 may optionally include a video source 24. The destination device 14 may include a Tx/RX element 26, a Tx/Rx unit 28 and a video decoder unit 30. As shown, the destination device 14 may optionally include a display device 32. Each of the Tx/Rx units 20, 28 may be or include a transmitter, a receiver or a combination of a transmitter and a receiver (e.g., a transceiver or transmitter-receiver). Each of the Tx/Rx elements 22, 26 may be, for example, an antenna. In accordance with this disclosure, video encoder unit 18 of source device 12 and/or the video decoder unit 30 of the destination device may be configured and/or adapted (collectively "adapted") to apply the coding techniques provided herein.

The source and destination devices 12, 14 may include other elements/components or arrangements. For example, the source device 12 may be adapted to receive video data from an external video source. And, the destination device 14 may interface with an external display device (not shown), rather than including and/or using the (e.g., integrated) display device 32. In some embodiments, a data stream generated by the video encoder unit 18 may be conveyed to other devices without the need for modulating the data onto a carrier signal, such as by direct digital transfer, wherein the other devices may or may not modulate the data for transmission.

The illustrated system 10 of FIG. 2 is merely one example. The techniques provided herein may be performed by any digital video encoding and/or decoding device. Although generally the techniques provided herein are performed by separate video encoding and/or video decoding devices, the techniques may also be performed by a combined video encoder/decoder, typically referred to as a "CODEC." Moreover, the techniques provided herein may also be performed by a video preprocessor or the like. The source device 12 and the destination device 14 are merely examples of such coding devices in which the source device 12 generates (and/or receives video data and generates) the encoded video information for transmission to the destination device 14. In some embodiments, the devices 12, 14 may operate in a substantially symmetrical manner such that each of the devices 12, 14 include both video encoding and decoding components and/or elements (collectively "elements"). Hence, the system 10 may support any of one-way and two-way video transmission between the devices 12, 14, e.g., for any of video streaming, video playback, video broadcasting, video telephony and video conferencing. In some embodiments, the source device 12 may be, for example, a video streaming server adapted to generate (and/or receive the video data and generate) the encoded video information for one or more destination devices, where the destination devices may be in communication with the source device 12 over wired and/or wireless communication systems.

The external video source and/or the video source 24 may be and/or include a video capture device, such as a video camera, a video archive containing previously captured video, and/or a video feed from a video content provider. Alternatively, the external video source and/or the video source 24 may generate computer graphics-based data as the source video, or a combination of live video, archived video, and computer-generated video. In some embodiments, if the video source 24 is a video camera, the source device 12 and destination device 14 may be or embody camera phones or video phones. As mentioned above, however, the techniques provided herein may be applicable to video coding in general, and may be applied to wireless and/or wired applications. In any case, the captured, pre-captured, computer-generated video, video feed, or other type of the video data (collectively "un-encoded video") may be encoded by the video encoder unit 18 so as to form the encoded video information.

The Tx/Rx unit 20 may modulate the encoded video information, e.g., according to a communication standard, so as to form one or more modulated signals carrying the encoded video information. The Tx/Rx unit 20 may also pass the modulated signals to its transmitter for transmission. The transmitter may transmit the modulated signals via the Tx/Rx element 22 to the destination device 14.

At the destination device 14, the Tx/Rx unit 28 may receive the modulated signals from over channel 16 via the Tx/Rx element 26. The Tx/Rx unit 28 may demodulate the modulated signals to obtain the encoded video information. The Tx/RX unit 28 may pass the encoded video information to the video decoder unit 30.

The video decoder unit 30 may decode the encoded video information to obtain decoded video data. The encoded video information may include syntax information defined by the video encoder unit 18. This syntax information may include one or more elements ("syntax elements"); some or all of which may be useful for decoding the encoded video information. The syntax elements may include, for example, characteristics of the encoded video information. The syntax elements may also include characteristics, and/or describe the processing, of the un-encoded video used to form the encoded video information.

The video decoder unit 30 may output the decoded video data for later storage and/or display on the external display (not shown). Alternatively, the video decoder unit 30 may output the decoded video data to the display device 32. The display device 32 may be and/or include any individual, multiple, combination, combination of multiples of a variety of display devices adapted to display the decoded video data to a user. Examples of such display devices include a liquid crystal display (LCD), a plasma display, an organic light emitting diode (OLED) display, a cathode ray tube (CRT), etc.

The communication channel 16 may be any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network, such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14. Details of an example communications system, which may facilitate such communication between the devices 12, 14, are provided below with reference to FIGS. 8, 9A-9E. Details of devices that may be representative of the devices 12, 14 are provided below, as well.

The video encoder unit 18 and the video decoder unit 30 may operate according to one or more standards and/or specifications, such as, for example, MPEG-2, H.261, H.263, H.264, H.264/AVC, H.264 as extended according to SVC extensions ("H.264/SVC"), etc. It is understood, however, the methods, apparatuses and systems provided herein are applicable to other video encoders, decoders and/or CODECs implemented according to (and/or compliant with) different standards, or to proprietary video encoders, decoders and/or CODECs, including future video encoders, decoders and/or CODECs yet to be developed. Further, the techniques provided herein, however, are not limited to any particular coding standard.

Relevant portions of H.264/AVC noted above are available from the International Telecommunications Union as ITU-T Recommendation H.264, or more specifically, "ITU-T Rec. H.264 and ISO/IEC 14496-10 (MPEG4-AVC), 'Advanced Video Coding for Generic Audiovisual Services,' v5, March, 2010;" which is incorporated herein by reference, and which may be referred to herein as the H.264 standard or H.264 specification, or the H.264/AVC standard or specification. The H.264/AVC standard was formulated by the ITU-T Video Coding Experts Group (VCEG) together with the ISO/IEC MPEG as a product of a collective partnership, known as the Joint Video Team (JVT). In some aspects, the techniques provided herein may be applied to devices that generally conform to the H.264 standard. The JVT continues to work on extensions to H.264/AVC standard.

Work to advance the H.264/AVC standard has been undertaken in various forums of the ITU-T, such as, the Key Technologies Area (KTA) forum. At least some of the forums seek, in part, advancement of coding technologies that exhibit higher coding efficiencies than that exhibited by the H.264/AVC standard. For example, the ISO/IEC MPEG and ITU-T VCEG have established a Joint Collaborative Team on Video Coding (JCT-VC), which has begun to develop a next generation video coding and/or compression standard, namely, the High Efficiency Video Coding (HEVC) standard. In some aspects, the techniques provided herein may provide for coding improvements relative to and/or in accordance with the H.264/AVC and/or HEVC (currently draft) standards.

Although not shown in FIG. 2, in some aspects, each of the video encoder and video decoder units 18, 30 may include and/or be integrated with an audio encoder and/or decoder (as appropriate). The video encoder and video decoder units 18, 30 may include appropriate MUX-DEMUX units, or other hardware and/or software, to handle encoding of both audio and video in a common data stream or, alternatively, separate data streams. If applicable, the MUX-DEMUX units may conform, for example, to the ITU-T Recommendation H.223 multiplexer protocol, or other protocols such as the user datagram protocol (UDP).

Each or multiples of the video encoder and video decoder units 18, 30 may be included in one or more encoders or decoders; any of which may be integrated as part of a CODEC, and may be integrated or otherwise combined with a respective camera, computer, mobile device, subscriber device, broadcast device, set-top box, server, and the like. Further, the video encoder unit 18 and the video decoder unit 30 may be implemented as any of a variety of suitable encoder and decoder circuitries, respectively, such as one or more microprocessors, digital signal processors (DSPs), application specific integrated circuits (ASICs), field programmable gate arrays (FPGAs), discrete logic, software, hardware, firmware or any combinations thereof. Alternatively, either or both of the video encoder and video decoder units 18, 30 may be implemented substantially in software, and accordingly, operations of the elements of the video encoder unit 18 and/or the video decoder unit 30 may be performed by appropriate software instructions executed by one or more processors (not shown). Again, such an embodiment, in addition to the processor, may also contain off-chip components, such as external storage (for example, in the form of non-volatile memory), input/output interfaces, etc.

In other embodiments, some of the elements of each of the video encoder unit 18 and the video decoder unit 30 may be implemented as hardware, while others may be implemented using appropriate software instructions executed by one or more processors (not shown). In any embodiment in which operations of elements of the of the video encoder and/or video decoder units 18, 30 may be performed by software instructions executed by one or more processors, such software instructions may be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

The 3D Graphics subgroup of International Organization for Standardization/International Electrotechnical Commission (ISO/IEC) Joint Technical Committee 1/SC29/Working Group 11 (JTC1/SC29/WG11) Moving Picture Experts Group (MPEG) has developed 3D point cloud compression (PCC) standards including: (1) a geometry-based compression standard for static point clouds; and (2) a video-based compression standard for dynamic point clouds. These standards may provide storage and transmission of 3D point clouds. These standards may also support lossy and/or lossless coding of point cloud geometry coordinates and attributes.

Figure 3:
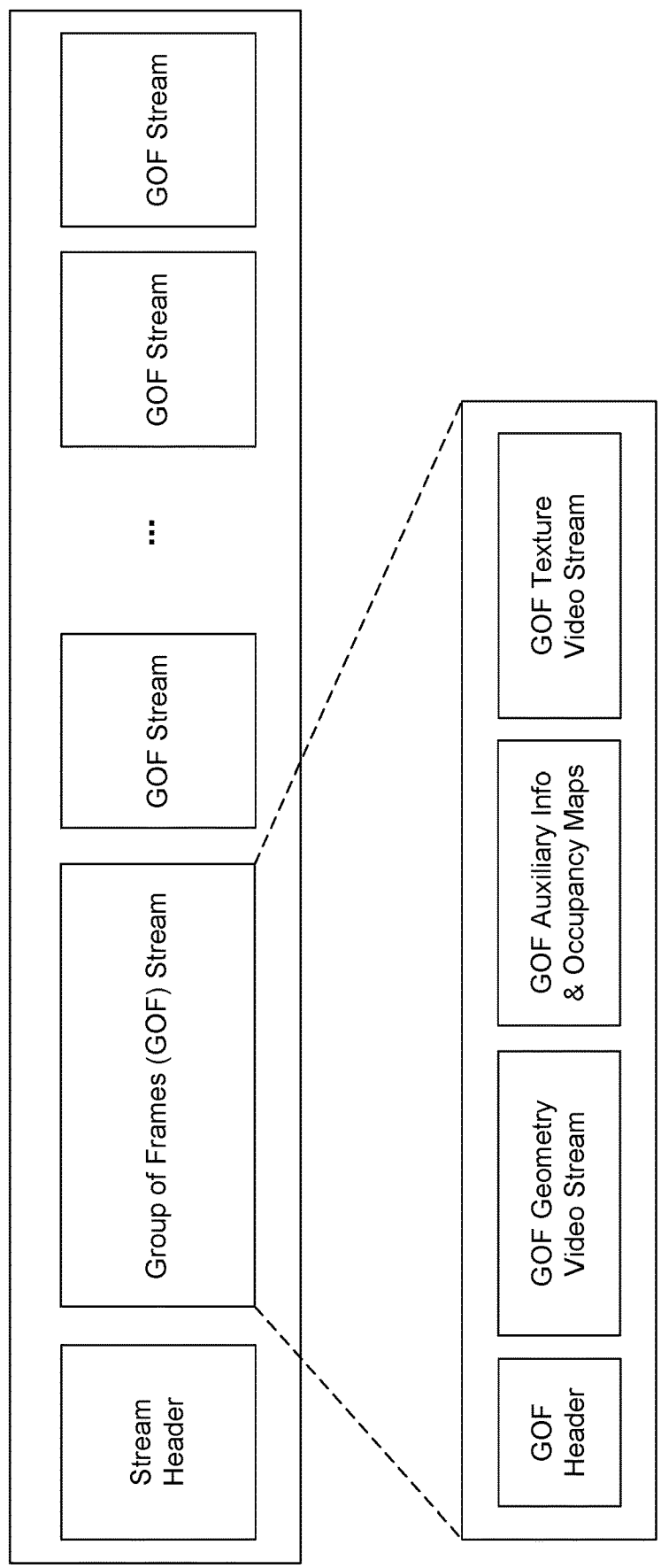
FIG. 3 is a diagram illustrating a structure of a bitstream for a video based point cloud compression (V-PCC)

FIG. 3 is a diagram illustrating a structure of a bitstream for a video based point cloud compression (V-PCC).

Referring to FIG. 3, bitstreams, e.g., generated video bitstreams, and metadata may be multiplexed together to generate a V-PCC bitstream. A bitstream syntax, for example, a bitstream syntax of the V-PCC standard associated with MPEG, may be defined as shown in Table 1.

TABLE 1

| V-PCC bitstream syntax | |
|---|---|
| bitstream( ) { | Descriptor |
|   bitstream_header( ) | |
|   ByteCount = 0 | |

TABLE 1-continued

V-PCC bitstream syntax

| bitstream( ) { | Descriptor |
|---|---|
|     while( ByteCount < bitstream_size_in_bytes){ | |
|         group_of_frames_header( ) | |
|         group_of_frames_geometry_video_stream( ) | |
|         group_of_frames_auxiliary_information( ) | |
|         group_of_frames_occupancy_map( ) | |
|         group_of_frames_texture_video_stream( ) | |
|     } | |
| } | |

Referring to the bitstream syntax of FIG. 3, a bitstream may start with a global header, for example, which may apply to the entire PCC bitstream, and the global header may followed by a sequence of group-of-frames (GOF) units. A GOF, e.g., one GOF unit, may provide a representation (e.g., a concatenated representation) of any number of PCC frames which share properties that may be defined in a GOF header (e.g. a header leading and/or at the beginning of a GOF unit). That is, a GOF unit may include a GOF header followed by a sequence of component streams.

Component streams may include one or more video streams (e.g., a video stream for texture, one or two video streams for geometry) and a metadata stream. However, the present disclosure is not limited thereto, and component streams may include any number of metadata streams. The metadata stream may include sub-streams, such as, for example, a sub-stream for occupancy maps and a sub-stream for auxiliary information. The information in the metadata stream may be associated with the geometry frames and may be used for reconstructing a point cloud. Streams within a GOF unit may be: (1) in sequence; and (2) not interleaved on a frame-by-frame basis.

Figure 4:
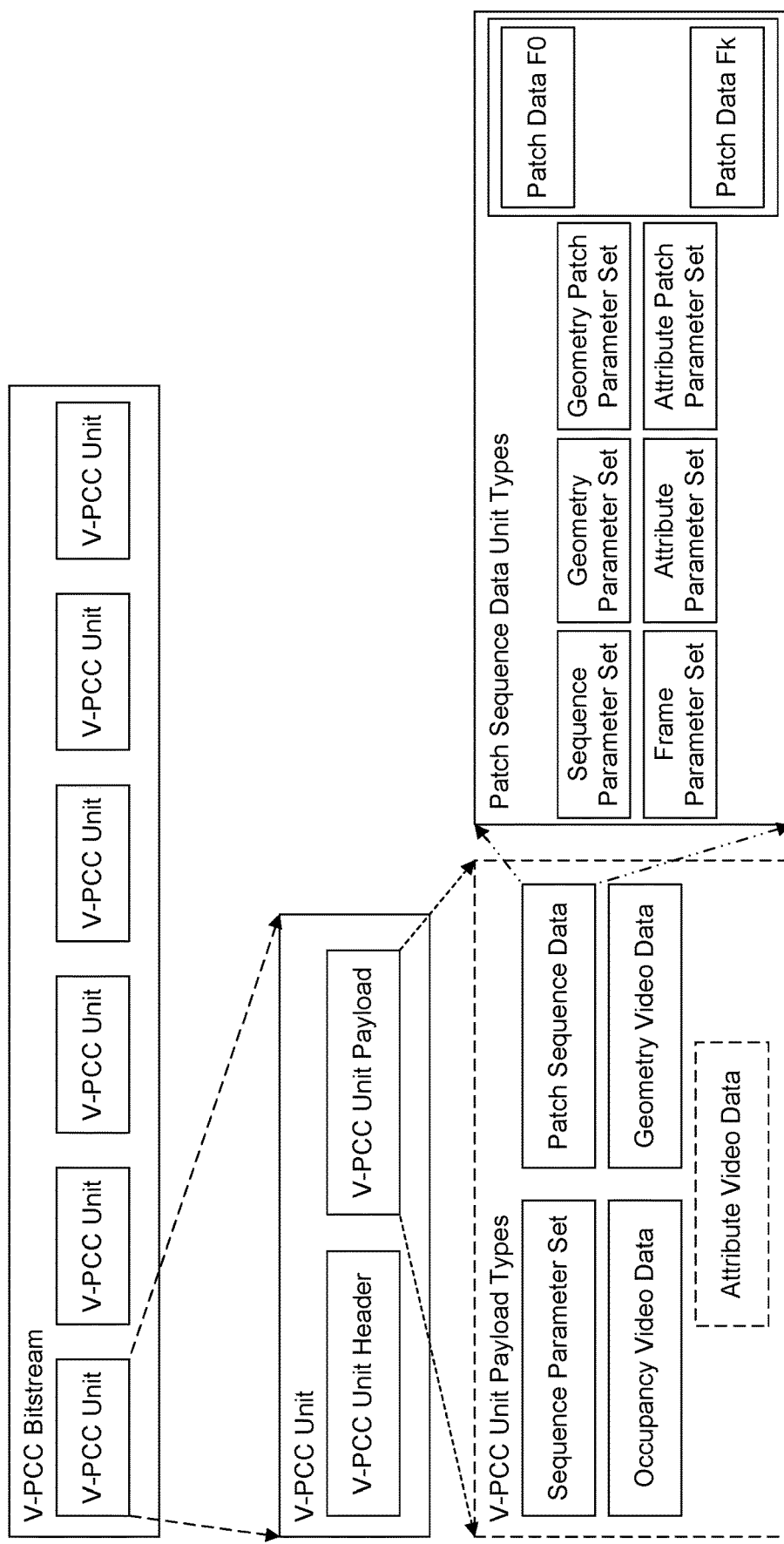
FIG. 4 is a diagram illustrating a structure of a V-PCC bitstream as a sequence of V-PCC units.

FIG. 4 is a diagram illustrating a structure of a V-PCC bitstream as a sequence of V-PCC units.

In a version of the V-PCC community draft (CD), a V-PCC bitstream may be composed of a set of V-PCC units as shown in FIG. 4. A syntax of a V-PCC unit, for example, as defined in the V-PCC CD, is shown below in Table 1. In such a case, each V-PCC unit has a V-PCC unit header and a V-PCC unit payload. The V-PCC unit header describes the V-PCC unit type, as shown below in Table 2. V-PCC units with unit types 2, 3, and 4, may respectively be defined (e.g., in the V-PCC CD) as occupancy, geometry, and attribute data units. These data units represent three (e.g., main) components (e.g., needed) for reconstructing the point cloud. In addition to the V-PCC unit type, a V-PCC attribute unit header also specifies the attribute type and its index, allowing multiple instance of the same attribute type to be supported.

The payload of occupancy, geometry, and attribute V-PCC units correspond to video data units (e.g., HEVC NAL units) that may be decoded by the video decoder specified in a corresponding occupancy, geometry, and attribute parameter set V-PCC unit.

TABLE 1

V-PCC unit syntax

| vpcc_unit( ) { | Descriptor |
|---|---|
|     vpcc_unit_header( ) | |
|     vpcc_unit_payload( ) | |
| } | |

TABLE 2

V-PCC unit header syntax

| vpcc_unit_header( ) { | Descriptor |
|---|---|
|     vpcc_unit_type | u(5) |
|     if( vpcc_unit_type = = VPCC_AVD \|\| vpcc_unit_type = = VPCC_GVD \|\| vpcc_unit_type = = VPCC_OVD \|\| vpcc_unit_type = = VPCC_PSD ) | |
|         vpcc_sequence_parameter_set_id | u(4) |
|     if( vpcc_unit_type = = VPCC_AVD ) { | |
|         vpcc_attribute_index | u(7) |
|         if( sps_multiple_layer_streams_present_flag ) { | |
|             vpcc_layer_index | u(4) |
|             pcm_separate_video_data( 11 ) | |
|         } | |
|         Else | |
|             pcm_separate_video_data( 15 ) | |
|     }else if( vpcc_unit_type = = VPCC_GVD ) { | |
|         if( sps_multiple_layer_streams_present_flag ) { | |
|             vpcc_layer_index | u(4) |
|             pcm_separate_video_data( 18 ) | |
|         } | |
|         Else | |
|             pcm_separate_video_data( 22 ) | |
|     } else | |
| if( vpcc_unit_type = = VPCC_OVD \|\| vpcc_unit_type = = VPCC_PSD ) { | |
|     vpcc_reserved_zero_23bits | u(23) |
|     } else | |
|         vpcc_reserved_zero_27bits | u(27) |
| } | |

TABLE 3

V-PCC unit payload syntax

| vpcc_unit_payload( ) { | Descriptor |
|---|---|
|     if( vpcc_unit_type = = VPCC_SPS ) | |
|         sequence_parameter_set( ) | |
|     else if( vpcc_unit_type = = VPCC_PSD) | |
|         patch_sequence_data_unit( ) | |
|     else if( vpcc_unit_type = = VPCC_OVD \|\| | |
|         vpcc_unit_type = = VPCC_GVD \|\| | |
|         vpcc_unit_type = = VPCC_AVD) | |
|         video_data_unit( ) | |
| } | |

The V-PCC CD specifies a V-PCC bitstream as a set of V-PCC units, with there being five types of V-PCC units: VPCC_SPS, VPCC_PSD, VPCC_OVD, VPCC_GVD and VPCC_AVD. The VPCC_SPS is referred by other unit types via vpcc_sequence_parameter_set_id at the unit header.

Figure 5:
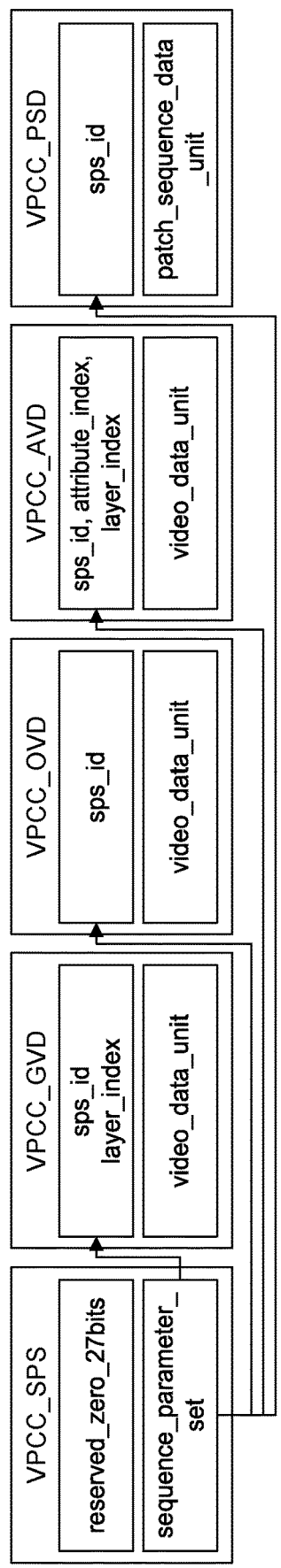
FIG. 5 is a diagram illustrating a V-PCC unit data type, unit header syntax and reference to an active sequence parameter set (SPS)

FIG. 5 is a diagram illustrating a V-PCC unit data type, unit header syntax and reference to an active sequence parameter set (SPS). A SPS contains sequence level syntax elements, such as sps_frame_width, sps_frame_height, sps_layer_count_minus1, and configuration flags. A SPS also includes syntax structs, such as profile_tier_level, occupancy_parameter_set, geometry_parameter_set and one or multiple attribute_parameter_set.

A VPCC_PSD also includes multiple PSD parameter set unit types, such as PSD_SPS, PSD_GFPS, PSD_GPPS, PSD_AFPS, PSD_APPS, PSD_FPS and PSD_PFLU. Each parameter set may refer to different sequence level parameter sets or PSD level parameter sets, and each parameter set includes multiple override, enable or present flags, for example, to reduce overhead.

Figure 6:
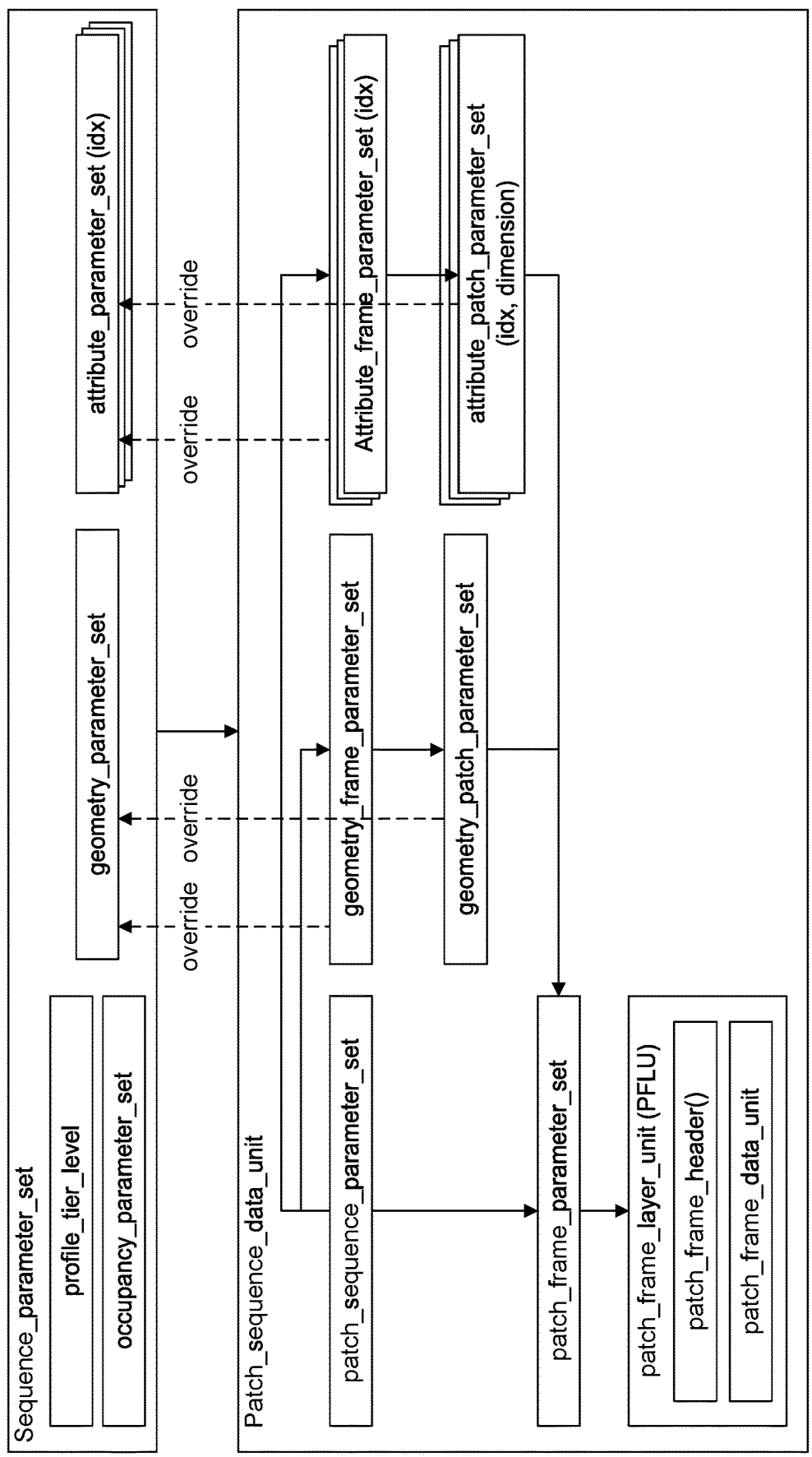
FIG. 6 is a diagram illustrating is a diagram illustrating SPS and PSD parameter sets.

FIG. 6 is a diagram illustrating SPS and PSD parameter sets. The parameter sets included in SPS and PSD, and the reference link between the parameter set and the higher-level parameter set, are shown in FIG. 6. The dash line of FIG. 6 indicates that the parameters at higher parameter set may be overwritten by the lower-level parameter set.

ISO Base Media File Format

According to MPEG standards, e.g., the ISO/IEC 14496 (MPEG-4) standard, file formats for time-based media may include several parts. For example, these parts may be based on, included in, and/or derived from the ISO Base Media File Format (ISOBMFF), which is a structural, media-independent definition.

A file format according to ISOBMFF may support (e.g., may contain, include, etc.) structural and/or media data information for timed presentations of media data, such as, for example audio, video, virtual/augmented reality, etc. ISOBMFF may also support un-timed data, such as, for example, meta-data at different levels within the file structure. According to ISOBMFF, a file may have a logical structure of a movie such that the movie may contain a set of time-parallel tracks. According to ISOBMFF, a file may have a time structure such that the tracks may include sequences of samples, e.g., in time. The sequences of samples may be mapped into a timeline of the overall movie. ISOBMFF is based in the concept of box-structured files. A box-structured file may include a series of boxes (e.g., wherein a box may be referred to as an atom), which have a size and a type. According to ISOBMFF, the types may be identified according to 32-bit values, which may be represented by four printable characters, also known a four-character code (4CC). According to ISOBMFF, un-timed data may be contained in a metadata box, e.g., at the file level, or may be attached to a movie box or a stream of timed data, e.g., a track, within the movie.

An ISOBMFF container includes a box, which may be referred to as a MovieBox (moov), which may contain metadata for (e.g., continuous) media streams included in the file (e.g., the container). Metadata may be signaled within the hierarchy of boxes in the MovieBox, e.g., within a TrackBox (trak). A track may represent a continuous media stream included in the file. A media stream may be a sequence of samples, such as audio or video access units of an elementary media stream, and may be enclosed within a MediaDataBox (mdat) that is present at a top-level of the file (e.g., the container). The metadata for each track may include a list of sample description entries, each providing, for example: (1) a coding and/or encapsulation format used in the track; and (2) initialization data for processing the format. Each sample may be associated with a sample description entry of the track. An explicit timeline map (e.g., for each track) may be defined using a tool, for example, an edit list. The edit list may be signalled using an EditListBox, wherein each entry may define part of the track timeline by any of: (1) mapping part of the composition timeline; or (2) indicating empty time (e.g., in a case where portions of the presentation timeline map to no media, an 'empty' edit). The EditListBox may have a syntax of:

```
aligned(8) class EditListBox extends FullBox('elst', version, flags) {
  unsigned int(32) entry_count;
  for (i=1; i <= entry_count; i++) {
    if (version==1) {
      unsigned int(64) edit_duration;
      int(64) media_time;
    } else { // version==0
      unsigned int(32) edit_duration;
      int(32) media_time;
    }
```

-continued

```
    int(16) media_rate_integer;
    int(16) media_rate_fraction = 0;
  }
}.
```

A media file may be generated incrementally, progressively downloaded, and/or adaptively streamed using a tool, for example, fragmentation. According to ISOBMFF, a fragmented container may include a MovieBox followed by a sequence of fragments, e.g., movie fragments. Each movie fragment may include: (1) a MovieFragmentBox (moof) that may include a subset of a sample table; and (2) a MediaDataBox (mdat) that may include samples of the subset of the sample table. The MovieBox may contain only non-sample-specific information, such as, for example, tracks and/or sample description information. Within the movie fragment, a set of track fragments may be represented by a number of TrackFragmentBox (traf) instances. A track fragment may have zero or more track runs, and a track run may document (e.g., represent) a contiguous run of samples for that track. A MovieFragmentBox may include a MovieFragmentHeaderBox (mfhd) which may include a sequence number (e.g., a number starting at 1 and sequentially changing in value for each movie fragment in the file).

3D Point Clouds 3D point clouds may be used for new media, such as VR and immersive 3D graphics in order to enable new forms of interaction and communication with VR and/or the new media. MPEG, via the 3D workgroup, has developed a standard that defines a bitstream for compressed dynamic point clouds. The bitstream defined in the MPEG standard is organized into a sequence of group of frames (GOF) units, and each GOF unit includes a sequence of component streams for a number of frames. In the case of the MPEG standard bitstream, a PCC decoder may need to analyze an entire bitstream, e.g., starting from the first bit, in order to seek a certain GOF and/or synchronize a GOF boundary. In such a case, since the PCC frames are not internally inter-leaved within a GOF unit, the entire GOF unit needs to be accessed (e.g., read, stored, etc.) for safe decoding and reconstruction. Further, in such a case, playback timing information is inherent to video coded component bit-streams' frame timing information. Also, in such a case, the utilized video codec for component streams may not be signaled at a higher level in the PCC bitstream, and the PCC bitstream may not provide support for media profiles, tiers, and/or levels that are PCC-specific.

According to embodiments, a bitstream, such as, for example, a PCC bitstream may be based on (e.g., may conform to, may be similar to, etc.) ISOBMFF. For example, a file format for a V-PCC bitstream may be based on the ISOBMFF. According to embodiments, a V-PCC bitstream may provide flexible storage and extraction of (e.g., different, multiple, sets of, etc.) components of a PCC stream. According to embodiments, a V-PCC bitstream may be reconstructed as (e.g., in the manner of, according to, similar to, compliant with, etc.) an ISOBMFF bitstream.

Figure 7:
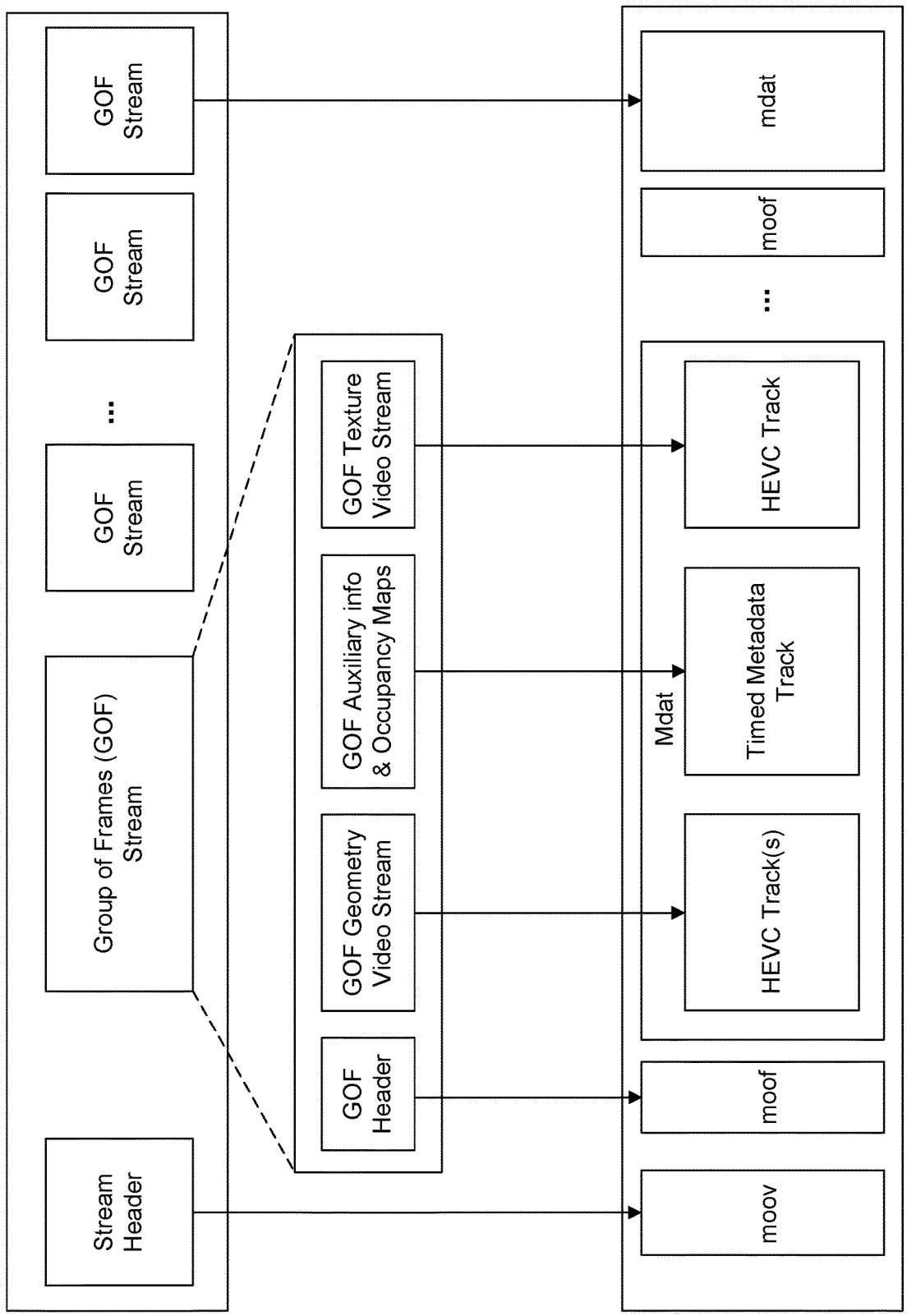
FIG. 7 is a diagram illustrating mapping of a GOF stream to a movie fragment.

FIG. 7 is a diagram illustrating mapping of a GOF stream to a movie fragment.

Fragments, e.g., ISOBMFF fragments, may be used for defining (e.g., identifying, delineating, demarcating, etc.) a V-PCC bitstream. Referring to FIG. 7, fragments, e.g., each movie fragment, may be defined by mapping: (1) GOF header data to a MovieFragmentBox; and (2) GOF video streams and/or GOF metadata (e.g., auxiliary information, occupancy maps, etc.) to a MediaDataBox of the movie fragment. In the case of FIG. 7, each GOF unit may be mapped to an ISOBMFF fragment, or in other words, only a one-to-one mapping between GOF units and movie fragments is shown.

Additionally, parameter set reference structure design for a VPCC patch sequence data unit (VPCC_PSD) may be problematic in certain cases. That is, it is a problematic case when the patch_frame_parameter_set refers to: an active patch sequence parameter set via pfps_patch_sequence_parameter_set_id, an active geometry patch parameter set via pfps_geometry_patch_frame_parameter_set_id, and an active attribute patch parameter set via pfps_attribute_patch_frame_parameter_set_id. Each active geometry patch parameter set refers active geometry frame parameter set via gpps_geometry_frame_parameter_set_id, and each active geometry frame parameter set refers to active patch sequence parameter set via gfps_patch_sequence_parameter_set_id. Further, each active attribute patch parameter set refers active attribute frame parameter set via apps_attribute_frame_parameter_set_id, and each active attribute frame parameter set refers to active patch sequence parameter set via afps_patch_sequence_parameter_set_id.

In the problematic case described above, when the value of pfps_patch_sequence_parameter_set_id, gfps_patch_sequence_parameter_set_id, and afps_patch_sequence_parameter_set_id are different, the patch frame parameter set may end up with reference to three different active patch sequence parameter sets, and it is problematic when different active patch sequence parameter sets contain different parameter values.

ISOBMFF Based V-PCC Bitstream

Figure 8:
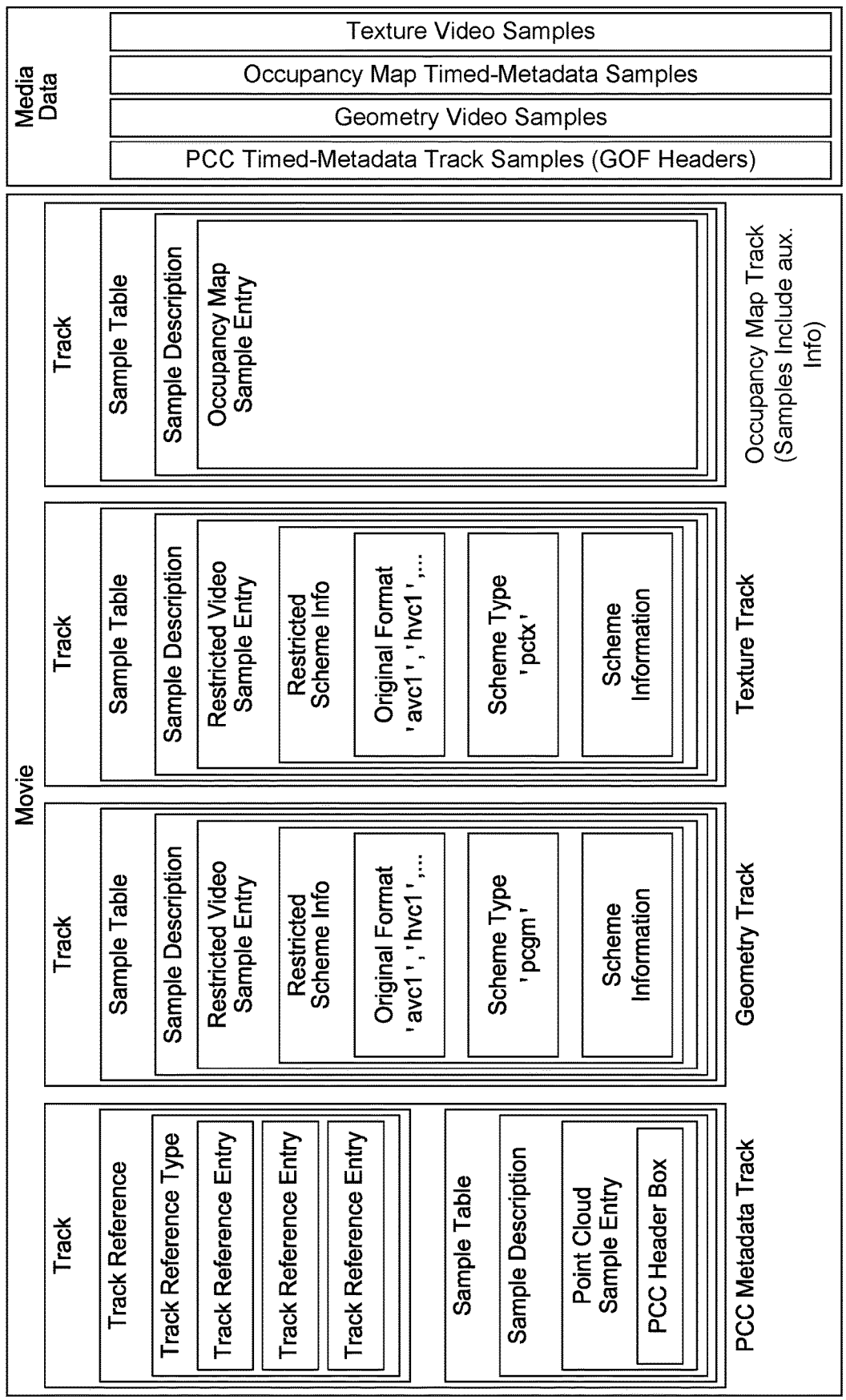
FIG. 8 is a diagram illustrating a V-PCC bitstream structure according to embodiments.

FIG. 8 is a diagram illustrating a V-PCC bitstream structure according to embodiments.

According to embodiments, a V-PCC bitstream structure may be based on a ISOBMFF bitstream structure. According to embodiments, items and/or elements (e.g., boxes), e.g., as illustrated in FIG. 8, may be mapped to (e.g., corresponding) ISOBMFF boxes. According to embodiments, component streams, may be mapped to individual tracks, for example, within a container file. According to embodiments, component streams for a V-PCC stream may include any of: (1) one or more (e.g., two or three) video streams for any of geometry or texture information; and (2) one or more timed-metadata stream for any of occupancy map or auxiliary information.

According to embodiments, other component streams (e.g., other than the types of component streams discussed above) may be included in a V-PCC stream. For example, other streams may include streams for any number or type of attributes associated with points of a point cloud, e.g., a 3D point cloud. According to embodiments, a (e.g., an additional) timed-metadata track may be included in a container file, for example, in order to provide GOF header information. According to embodiments, metadata, may be signaled. According to embodiments, metadata, such as information describing characteristics of component streams and/or relationships between different tracks in a file, may be signaled, for example, using tools provided according to MPEG standards.

According to embodiments, samples for media and/or timed-metadata tracks may be contained in a MediaDataBox (mdat). According to embodiments, samples of a stream may be sequentially stored in the MediaDataBox. For example, in the case of media storage, samples of each stream may be stored together in the MediaDataBox with the streams being in sequence such that a sequence including all samples of a first stream may be followed by another sequence including all samples of a second stream.

According to embodiments, samples of a component (e.g., a component stream) may be divided into chunks. For example, samples of a component stream may be divided into chunks according to any of a size of GOF units. According to embodiments, chunks may be interleaved. Chunks may be interleaved within the MediaDataBox, for example, in order to support progressive download of a V-PCC bitstream. According to embodiments, chunks may be of (i.e., may have) different sizes, and samples within a chunk may be of (i.e., may have) different sizes.

A SampleToChunkBox (stsc) may be contained in a SampleTableBox (stbl) of a track, and a SampleToChunkBox (stsc) may include a table. According to embodiments, a SampleToChunkBox may be used to find (e.g., may indicate, may be used to determine) any of: a chunk that contains a sample, a position associated with a chunk (e.g., one or more samples), or information describing a sample associated with chuck. According to embodiments, a ChunkOffsetBox (stco or co64) may be included in a SampleTableBox (stbl) of a track, and may indicate (e.g., may give) an index of each chunk in a containing file (e.g., in a container).

Geometry and Texture Tracks

According to embodiments, a component video stream of a PCC bitstream may be mapped to a track in an ISOBMFF container file. For example, each component video stream (e.g., each of the texture and geometry streams) in a PCC bitstream may be mapped to a track in an ISOBMFF container file. In such a case, access units (AUs) of a component stream may be mapped to samples for a corresponding track. There may be a case where component streams, for example, texture and geometry streams, are not directly rendered.

According to embodiments, restricted video schemes may be used to signal post-decoder requirements associated with tracks of component streams. For example, restricted video schemes, as defined according to ISOBMFF, may be used to signal post-decoder requirements associated with the tracks of the texture and geometry streams. According to embodiments, signaling post-decoder requirements associated with tracks of component streams may enable players/decoders to inspect a file (e.g., a container) and identify requirements for rendering a bitstream. According to embodiments, signaling post-decoder requirements associated with tracks of component streams may enable legacy players/decoders to not decode and/or not render component streams. According to embodiments, restricted schemes (e.g., restricted video schemes) may be applied to any of geometry tracks and texture tracks of a PCC bitstream.

According to embodiments, any of geometry and texture tracks may be (e.g., transformed into, labeled as, considered as, etc.) restricted video scheme tracks. According to embodiments, for any of geometry and texture tracks, respective sample entry codes may be set to the four-character code (4CC) 'resv', and a RestrictedSchemeInfoBox may be added to respective sample descriptions, for example, while leaving all other boxes unmodified. According to embodiments, an original sample entry type, which may be based on the video codec used for encoding the stream, may be stored in an OriginalFormatBox within the RestrictedSchemeInfoBox.

A nature of a restriction (e.g., a scheme type) may be defined in a SchemeTypeBox, and information associated with (e.g., data needed for) that scheme may be stored in a SchemeInformationBox, for example, as defined by ISOBMFF. The SchemeTypeBox and SchemeInformationBox may be stored within the RestrictedSchemeInfoBox. According to embodiments, a scheme_type field (e.g., included in a SchemeTypeBox) may be used to indicate a point cloud geometry restricted scheme. For example, in the case of geometry video stream tracks, a scheme_type field included in a SchemeTypeBox may be set to 'pcgm' to indicate that the nature of the restriction is a point cloud geometry restricted scheme. As another example, in the case of texture video stream tracks, a scheme_type field may be set to 'pctx', indicating a point cloud texture restricted scheme. A PCCDepthPlaneInfoBox may be included in a SchemeInformationBox of each track. According to embodiments, in a case where two or more geometry tracks are present in a file (e.g. a container), a PCCDepthPlaneInfoBox may indicate (e.g., identify, include information indicating, etc.) respective depth image plane information for each track. For example, in a case where there are two geometry tracks, the depth image plane information may indicate which track contains depth image plane 0 video stream and which track contains depth image plane 1 video stream. According to embodiments, a PCCDepthPlaneInfoBox may include a depth_image_layer, which may be a field including depth image plane information. For example, a depth_image_layer may be (e.g., information indicating) an index of a depth image plane, wherein value 0 indicates depth image plane 0, value 1 indicates depth image plane 1, and other values are reserved for future use. According to embodiments, a PCCDepthPlaneInfoBox including a depth_image_layer may be defined as:

```
aligned(8) class PCCDepthPlaneInfoBox extends Box {
    unsigned int(4) depth_image_layer;
    bit(4) reserved = 0;
}.
```

According to embodiments, in a case where: (1) multiple layers are available for any of the geometry or the texture components, and (2) any number of component layers are carried in a component track, these layers may be signaled in a PCCComponentLayerInfoBox in the SchemeInformationBox of the track. A PCCComponentLayerInfoBox may be defined as:

```
aligned(8) class PCCComponentLayerInfoBox extends Box('pcli') {
    unsigned int(4) min_layer;
    unsigned_int(4) max_layer;
}.
```

According to embodiments, semantics for PCCComponentLayerInfoBox may include: (1) min_layer may indicate an index of a minimum layer for a V-PCC component carried by a track; and (2) max_layer may indicate an index of a maximum layer for a V-PCC component carried by a track.

According to embodiments, a V-PCC texture component may be (e.g., considered as) a sub-type of a (e.g., more) generic video-coded component type, which may be referred to as a V-PCC attribute component. Further, a set of attribute tracks may be present in a container where a subset of those tracks may carry information for texture attributes. Attribute tracks may be restricted video scheme tracks, for example, with a scheme_type field of a SchemeTypeBox set to the 4CC 'pcat'. A PCCAttributeInfoBox in a SchemeInformationBox may identify a type of an attribute, and the value of attribute_type may indicate the type of the attribute, for example, as defined in the V-PCC CD. A PCCAttributeInfoBox may be defined as:

```
aligned(8) class PCCAttributeInfoBox extends Box('pcai') {
    unsigned int(4) attribute_type;
    bit(4) reserved = 0;
}.
```

The video coder for encoding texture and geometry video streams is not restricted. Further, texture and geometry video streams may be encoded using different video codecs. According to embodiments, a decoder (e.g., a PCC decoder/player) may identify a codec (e.g., a type of a codec) used for a component video stream. For example, a PCC decoder/player may identify a type of codec used for a certain component video stream by checking the sample entry of its track in an ISOBMFF container file. A header of each GOF in a V-PCC stream may include a flag, e.g., absolute_d1_flag, indicating how geometry layers other than the layer nearest to the projection plane are coded. In a case where absolute_d1_flag is set, two geometry streams may be used for reconstructing a 3D point cloud, and in a case where absolute_d1_flag is not set, only one geometry stream may be used for reconstructing a 3D point cloud.

According to embodiments, a value of the absolute_d1_flag may change across GOF units. For example, for one or more period within a presentation time, there may be no samples in a second geometry track. According to embodiments, a change in the value of the absolute_d1_flag may across GOF units may be signaled using an EditListBox in the second geometry track. According to embodiments, a parser (e.g., included in a PCC decoder/player) may determine whether a second geometry track may be reconstructed based on information in an edit list. For example, a PCC decoder/player may determine whether a second geometry track may be reconstructed by checking the edit list of the second geometry track for the availability of samples at a given timestamp.

Occupancy Map and Auxiliary Information Track

According to embodiments, a decoder may use any of an occupancy map and auxiliary information to reconstruct a 3D point cloud. For example, at the decoder-side, the point cloud may be reconstructed from the geometry stream using the occupancy map and auxiliary information. The occupancy map and auxiliary information may be part of a stream other than the geometry stream within each GOF unit. According to embodiments, the occupancy map and auxiliary information may be included in (e.g., a separate) timed-metadata track, which we may be referred to as an occupancy map track. According to embodiments, samples for an occupancy map track may contain any of an occupancy map and auxiliary information for a single frame. According to embodiments, an occupancy map track may be identified by the following sample entry in a sample description of a track:

```
aligned(8) class PCCOccupancyMapSampleEntry extends
MetaDataSampleEntry('pcom') {
}.
```

According to embodiments, two timed-metadata tracks may be used for separately carrying occupancy map information and auxiliary information. According to embodiments, an occupancy map track may have a sample entry as shown above for the case of a single combined occupancy map and auxiliary information track. According to embodiments, a timed-metadata track for auxiliary information may have the following sample entry in its sample description:

```
aligned(8) class PCCAuxInfoSampleEntry extends
MetaDataSampleEntry('pcax') {
}.
```

According to embodiments, auxiliary information, such as patch data, may be carried in the samples of the point cloud metadata track, and, for example, no separate auxiliary information track may be needed.

According to embodiments, an occupancy map may be coded using a video coder and the generated video stream may be placed in a restricted video scheme track. According to embodiments, a scheme_type field of the SchemeType-Box of a restricted video scheme track may be set to 'pomv', for example, in order to indicate a point cloud occupancy map restricted video scheme.

Point Cloud Metadata Track

Metadata for a PCC bitstream may appear at different levels within the bitstream, for example, in a global header and in a header of GOF unit. Further, metadata may be applicable at any of a frame-level and a patch-level for occupancy maps. According to embodiments, a point cloud metadata track may include metadata associated with any of a global header and a GOF header. According to embodiments, a point cloud metadata track may be a (e.g., separate, single, etc.) timed-metadata track, and metadata information may be organized as described below.

Global header information may apply to all GOF units within the stream. According to embodiments, global header information may be stored at the sample description of the timed-metadata track which is considered the entry point when parsing a PCC file. According to embodiments, a PCC decoder/player that is decoding/playing the PCC stream may look for this timed-metadata track in the container. According to embodiments, this timed-metadata track may be identified by PointCloudSampleEntry in the sample description of the track. According to embodiments, the PointCloudSampleEntry may contain a PCCDecoderConfigurationRecord, for example, in order to provide any of: (1) information about the PCC profile of the bitstream; and (2) information about video codecs that the player may need to support in order to decode component streams. According to embodiments, the PointCloudSampleEntry may also contain a PCCHeaderBox, for example, in order to include information signaled in a global bitstream header (e.g., of the MPEG V-PCC).

According to embodiments, a syntax of the PointCloudSampleEntry may be as follows:

```
aligned(8) class PCCHeaderStruct( ) {
   unsigned int(32) pcc_category2_container_version;
   bit(1) gof_metadata_enabled_flag;
   if (gof_metadata_enabled_flag) {
      bit(1) gof_scale_enabled_flag;
      bit(1) gof_offset_enabled_flag;
      bit(1) gof_rotation_enabled_flag;
      bit(1) gof_point_size_enabled_flag;
      bit(1) gof_point_shape_enabled_flag;
      bit(2) reserved = 0;
   } else {
      bit(7) reserved = 0;
   }
   // other fields and flags applicable to entire PCC bitstream
}
aligned(8) class PCCHeaderBox extends Box {
   PCCHeaderStruct( );
}
aligned(8) class PCCDecoderConfigurationRecord( ) {
   unsigned int(8) configurationVersion = 1;
   unsigned int(2) general_profile_space;
   unsigned int(1) general_tier_flag;
   unsigned int(5) general_profile_idc;
   unsigned int(8) general_level_idc;
}
aligned(8) class PointCloudSampleEntry extends
MetaDataSampleEntry('pcmt') {
   PCCDecoderConfigurationRecord( );
   PCCHeaderBox( );
}.
```

According to embodiments, semantics for the fields of PCCHeaderStruct may be: (1) pcc_category2_container_version indicates the version of the PCC bitstream; (2) gof_metadata_enabled_flag indicates whether PCC metadata are enabled at the GOF-level; (3) gof_scale_enabled_flag indicates whether scaling is enabled at the GOF-level; (4) gof_offset_enabled_flag indicates whether offsetting is enabled at the GOF-level; (5) gof_rotation_enabled_flag indicates whether rotation is enabled at the GOF-level; (6) gof_point_size_enabled_flag indicates whether point size is enabled at the GOF-level; and (7) gof_point_shape_enabled_flag indicates whether point shape is enabled at the GOF-level. According to embodiments, semantics for the fields of PCCDecoderConfigurationRecord may be: (1) configurationVersion is a version field; incompatible changes to the record are indicated by a change of version number in the version field; (2) general_profile_space specifies the context for the interpretation of general_profile_idc; (3) general_tier_flag specifies the tier context for the interpretation of general_level_idc; (4) general_profile_idc when general_profile_space is equal to 0, indicates a profile to which the coded point cloud sequence conforms; and (5) general_level_idc indicates a level to which the coded point cloud sequence conforms.

According to embodiments, information that applies to GOF units (e.g., any information that applies to all GOF units) may be stored at a sample description of a timed-metadata track. According to embodiments, fields of PCCDecoderConfigurationRecord may be part of a PCCHeaderStruct. According to embodiments, a PCCHeaderBox may be a top-level box within a MovieBox. According to embodiments, a PCC decoder/player may (e.g., easily) identify whether it can decode and play a file and may determine whether the listed profile is supported, for example, without having to parse all the tracks in the file to find the PCC metadata track. According to embodiments, each sample in the point cloud metadata track may contain GOF header information, for example, as defined according to MPEG V-PCC. According to embodiments, a syntax of a GOFHeaderSample, and a GOFHeaderStruct that is a data structure including all fields defined in a GOF header, are shown below:

```
aligned(8) class GOFHeaderStruct( ) {
   // all fields and flags in GOF header are defined here
}
aligned(8) class GOFHeaderSample( ) {
   GOFHeaderStruct( );
}.
```

According to embodiments, a parser (e.g., a PCC decoder/player) may identify how many frames are in a GOF unit by parsing a GOF metadata sample. For example, the parser may identify how many frames are in the GOF unit, for example, so that the correct number of samples may be read from geometry and texture video tracks. According to embodiments, a point cloud metadata track may be linked to the component video tracks. For example, a track reference tool of the ISOBMFF standard may be used to link the point cloud metadata track to the component video tracks.

According to embodiments, a content description reference 'cdsc' may be used to link a PCC metadata track to the component tracks. Or in other words, a content description reference 'cdsc' from the PCC metadata track to the component tracks may be generated. According to embodiments, the link may be formed by: (1) adding a TrackReferenceBox to (e.g., within) the TrackBox; and (2) placing a TrackReferenceTypeBox of type 'cdsc' within the TrackReferenceBox. According to embodiments, a TrackReferenceTypeBox may contain any number of track_IDs designating component video tracks that the PCC metadata references. According to embodiments, a new track reference type for PCC bitstreams may be defined, for example, instead of 'cdsc'. According to embodiments, a chain of track references may be used by: (1) adding a 'cdsc' track reference from the PCC metadata track to the geometry video track(s); and (2) adding 'auxl' track references from the geometry video track(s) to the occupancy map and texture tracks.

According to embodiments, a point cloud parameter set track may be used, for example, instead of a timed-metadata track. According to embodiments, a point cloud parameter set track may be similar to an AVC parameter set track, for example, as defined by ISO/IEC. According to embodiments, a sample entry for this track may be defined as follows:

```
Sample Entry Type: 'pccp'
Container:     Sample Description Box ('stsd')
Mandatory:     Yes
Quantity:      One or more sample entries may be present
class PCCParameterSampleEntry( ) extends SampleEntry ('pccp'){
    PCCConfigurationBox config;
}.
```

According to embodiments, a PCC parameter stream sample entry may contain (e.g., include) a PCC Parameter Stream Configuration Box, which may be defined as follows:

```
class PCCConfigurationBox extends Box('pccC') {
    PCCDecoderConfigurationRecord( ) PCCConfig;
}.
```

According to embodiments, samples in a PCC parameter set track may have a decoding time equal to (e.g., at the instance of) when a parameter set(s) comes into effect, for example, at the time of/when a first frame of a corresponding GOF is decoded.

According to embodiments, in a case where the bitstream is structured as a sequence of V-PCC units, for example, as described in the V-PCC CD, parameter set V-PCC units may be carried in a (e.g., new type of) track, for example, that is identified by the media handler type 4CC 'vpcc' and has a sample entry of the type 'vpc1'. According to embodiments, the (e.g., new type of) track identified by the media handler type 4CC 'vpcc' may be defined as:

```
Sample Entry Type: 'vpc1'
Container:     SampleDescriptionBox ('stsd')
Mandatory:     No
Quantity:      0 or 1
aligned(8) class VPCCSampleEntry extends SampleEntry ('vpc1') {
    vpcc_unit_payload( )[ ];
}.
```

According to embodiments, a vpcc_unit_payload array may (e.g., only) contain payloads of sequence-level parameter sets. According to embodiments, in a case where a sequence parameter set is defined to include any of occupancy, geometry, or attribute parameter sets, for example, as defined in the V-PCC CD, then the vpcc_unit_payload array may (e.g., only) contain sequence parameter set V-PCC units. According to embodiments, in a case where multiple sequence-level parameter sets are defined, the vpcc_unit_payload may (e.g., shall) be a payload of one of the sequence-level parameter sets (e.g., any of sequence, geometry, occupancy, or attribute parameter sets), for example, by separating the sequence parameter set from the other component parameter sets (e.g., geometry, occupancy, and attribute parameter sets). According to embodiments, in a case where. a patch unit sequence parameter set (e.g., a PSD_SPS as defined in the V-PCC CD) contains information applying to an entire sequence, the PSD_SPS payload may (e.g., also) be stored in the vpcc_unit_payload array of a VPCCSampleEntry. According to embodiments, for example, as an alternative to directly extending SampleEntry, a VPCCSampleEntry may be defined to extend a (e.g., newly defined) VolumentricSampleEntry which may extend a SampleEntry and may provide a basis sample entry type for volumetric media. Samples in this track may correspond to point cloud frames. Each V-PCC sample may contain any number of vpcc_unit_payload instances, for example, with a restriction of only containing patch_sequence_data V-PCC unit payloads. Samples corresponding to the same frame across component tracks may have the same composition time as the corresponding sample for that frame in a V-PCC track.

According to embodiments, a VPCCSampleEntry may be such that a vpcc_unit_payload array may (e.g., only) contain payloads of sequence-level parameter sets, for example, a sequence parameter set and, if separate, geometry, occupancy, and attribute parameter sets. According to embodiments, a VPCCSampleEntry may be defined as:

```
aligned(8) class PCCDecoderConfigurationRecord( ) {
    unsigned int(8) configurationVersion = 1;
    unsigned int(2) general_profile_space;
    unsigned int(1) general_tier_flag;
    unsigned int(5) general_profile_idc;
    unsigned int(8) general_level_idc;
    unsigned int(8) num_sps;
    for (i=0; i<num_sps; i++) {
        vpcc_unit_payload( );
    }
}
class PCCConfigurationBox extends Box('pccC') {
    PCCDecoderConfigurationRecord( ) PCCConfig;
}
aligned(8) class VPCCSampleEntry extends SampleEntry ('vpc1') {
        PCCConfigurationBox config;
}
```

Component Tracks with Multiple Layers

Component tracks may carry more than one layer of the component, and a player may (e.g., should) be able to identify and extract samples belonging to a particular layer.

According to embodiments, a sample grouping feature (e.g., of ISO/IEC 14496-12) may be utilized. According to embodiments, a new sample group description, for example, with grouping type set to the 4CC 'vpld', for grouping component layer samples may be defined as:

```
Group Type: 'vpld'
Container:      Sample Group Description Box ('sgpd')
Mandatory:      No
Quantity:       Zero or more.
aligned(8) class VPCCLayerSampleGroupEntry extends
VisualSampleGroupEntry('vpld') {
unsigned int(4) layer_index;
bit(3) reserved = 0;
bit(1) absolute_coding_flag;
if (absolute_coding_flag == 0)
   unsigned int(4) predictor_layer_index;
   bit(4) reserved = 0;
}
```

According to embodiments, semantics for a VPCCLayerSampleGroupEntry may be: (1) a layer_index may be an index of a layer to which samples of a group belong; (2) an absolute_coding_flag may indicate whether samples of a layer associated with a sample group depend on samples from another layer sample group, wherein, in a case where absolute_coding_flag is set to 1, the samples may (e.g., do) not depend on samples of another layer, and wherein, in a case where absolute_coding_flag is set to 0, the samples may depend on samples of another layer; and (3) a predictor_layer_index may be an index of a layer on which the samples of the group depend.

According to embodiments, the mapping of samples to a corresponding layer group may be done using a SampleToGroupBox, for example, as defined in ISO/IEC 14496-12. The SampleToGroupBox may contain a number of entries, for example, where each entry associates a number of consecutive samples to one of the group entries in the SampleGroupDescriptionBox.

Single Point of Entry for Point Cloud Data in Container File

According to embodiments, the information about (e.g., all) tracks constituting a single V-PCC content may be signaled in a single location in the container file, and for example, players may identify these tracks and their types as early as possible without having to parse the sample description of each track. According to embodiments, such early identification may be achieved by signaling track information in one box, for example, at a top-level of a container file, or within a MetaBox ('meta') present at the top-level of the file.

According to embodiments, such box may be a (e.g., newly-defined) box with a new box type or a box that inherits from and extends the EntityToGroupBox, for example, defined in ISO/IEC 14496-12. According to embodiments, the signaled information may include a list of trackIDs of (e.g., all the) tracks that belong to the V-PCC content. For each signaled track, the track type (e.g., metadata, occupancy map, geometry, etc.) as well as the component layers which are carried by the track, if applicable, may be (e.g., also) signaled in such box. According to embodiments, such box may (e.g., also) contain information about the profile and level of the content. According to embodiments, such box (e.g., a newly-defined box) to carry the aforementioned information may be defined as:

```
aligned(8) class VPCCContentBox extends Box('vpct') {
   unsigned int(32) content_id;
   unsigned int(32) num_tracks;
```
-continued
```
   for (i=0; i<num_tracks; i++) {
      unsigned int(32) track_id;
      unsigned int(4) track_type;
      unsigned int(4) min_layer;
      unsigned int(4) max_layer;
         bit(4) reserved = 0;
   }
   vpcc_profile_level( );
}
```

According to embodiments, semantics for the fields of VPCCContentBox may be: (1) content_id is a unique id for the V-PCC content among all V-PCC content stored in the container; num_tracks indicates the total number of tracks that are part of the V-PCC content; (2) track_id is the trackID of one of the tracks stored in the container; (3) track_type indicates the type of the component track (e.g., texture, geometry, metadata, etc.); (4) min_layer indicates the index of the minimum layer for the V-PCC component carried by the track; and (5) max_layer indicates the index of the maximum layer for the V-PCC component carried by the track.

According to embodiments, another example for the definition of V-PCC content information box may be for when extending the EntityToGroupBox, for example, as defined by ISO/IEC. That is, according to embodiments, the V-PCC content information box may be defined as:

```
aligned(8) class EntityToGroupBox(grouping_type, version, flags)
extends FullBox(grouping_type, version, flags) {
   unsigned int(32) group_id;
   unsigned int(32) num_entities_in_group;
   for(i=0; i<num_entities_in_group; i++)
      unsigned int(32) entity_id;
   }
   // the remaining data may be specified for a particular grouping_type
}
aligned(8) class VPCCContentGroupingBox extends EntityToGroupBox
('vpcg',
version, flags) {
   for (i=0; i<num_entities_in_group; i++) {
      unsigned int(4) track_type;
      unsigned int(4) min_layer;
      unsigned int(4) max_layer;
      bit(4) reserved = 0;
   }
   vpcc_profile_level( );
}
```

According to embodiments, semantics of any of track_type, min_layer, and max_layer may be identical to semantics of corresponding fields for the VPCCContentBox defined above.

Signaling Alternative Versions of Point Cloud Content and Components

According to embodiments, in a case where more than one version of the same point cloud is available in the ISOBMFF container (e.g., different resolutions of the same point cloud), each version may have a separate point cloud metadata track.

According to embodiments, the alternate track mechanism defined in ISO/IEC 14496-12 may be used to signal that these tracks are alternatives of each other. According to embodiments, point cloud metadata tracks that are alternatives of each other may (e.g., should) have identical values for the alternate_group field in their respective TrackHeaderBox(es) in the ISOBMFF container.

Similarly, when multiple versions (e.g., bitrates) of a point cloud component (e.g., any of a geometry, occupancy, or attribute component) are available, the alternate_group field in the TrackHeaderBox(es) for the different versions of the component may (e.g. should) have the same value.

According to embodiments, a single point cloud metadata track carrying metadata for different versions of the same point cloud may be available in the ISOBMFF container. According to embodiments, the sequence parameter sets for each version may be signaled in separate sample entries in the SampleDescriptionBox for the sample table of the track. The type of these sample entries may be VPCCSampleEntry. According to embodiments, a sample grouping feature (e.g., of ISO/IEC 14496-12) may be used for grouping samples in the point cloud metadata track that belong to each version.

Fragmented ISOBMFF Container for V-PCC Bitstreams

Figure 9:
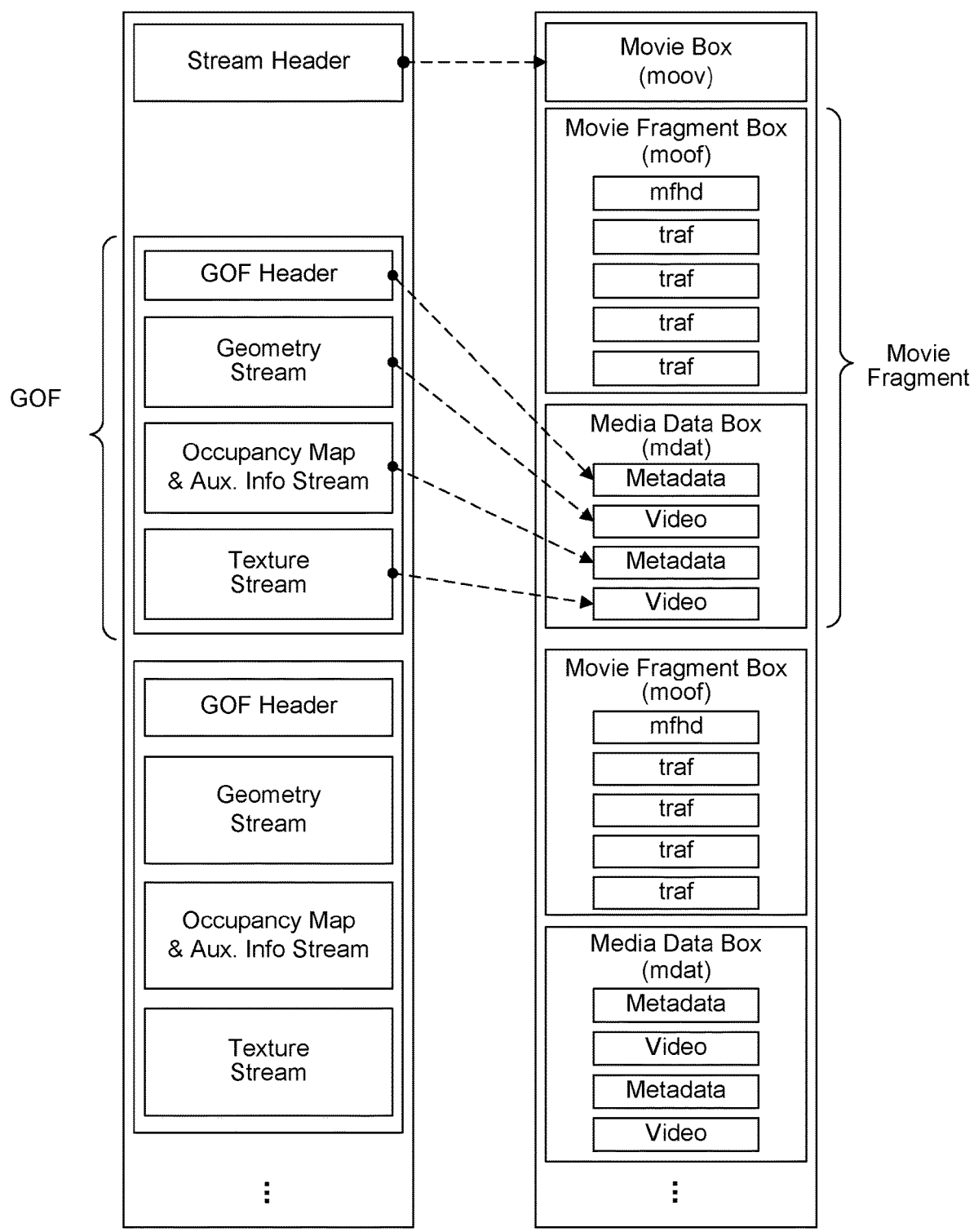
FIG. 9 is a diagram illustrating a fragmented ISOBMFF container for V-PCC bitstreams, according to embodiments.

FIG. 9 is a diagram illustrating a fragmented ISOBMFF container for V-PCC bitstreams, according to embodiments.

According to embodiments, GOF units may be mapped to ISOBMFF movie fragments. Referring to FIG. 9, each movie fragment may correspond to one or more GOF units in an (e.g., elementary) V-PCC bitstream. According to embodiments, a movie fragment may contain only samples for corresponding GOF units. According to embodiments, metadata pertaining to the entire bitstream, such as, for example, a global stream header, and the number of tracks present (e.g., included) in a container may be stored in a MovieBox. According to embodiments, a MovieBox may contain a (e.g., one) TrackBox for each component stream and a (e.g., an additional) TrackBox for a GOF header timed-metadata track.

According to embodiments, there may be a case of one-to-one mapping, wherein each movie fragment contains only one GOF unit. In such a case, there may be no need for the GOF header timed-metadata track. According to embodiments, a GOF header may be stored in the MovieFragmentHeaderBox. According to embodiments, the MovieFragmentHeaderBox may include optional boxes including a PCCGOFHeaderBox. According to embodiments, a PCCGOFHeaderBox may be defined as follows:

```
aligned(8) class PCCGOFHeaderBox extends Box('pcgh') {
    GOFHeaderStruct( );
}.
```

According to embodiments, in a case where the V-PCC elementary stream is composed of a set of V-PCC units, the V-PCC sequence parameter set information may be included in a VPCCSampleEntry for the point cloud metadata track in the MovieBox.

Multiple Point Cloud Streams

According to embodiments, an ISOBMFF container may include more than one V-PCC stream. According to embodiments, each stream may be represented by a set of tracks. According to embodiments, track grouping (e.g., a track grouping tool) may be used to identify the stream to which a track belongs. According to embodiments, for example, for one PCC stream, a TrackGroupBox ('trgr') may be added to: (1) the TrackBox of all component streams; and (2) a PCC metadata track. According to embodiments, a syntax for a PCCGroupBox may define a (e.g., new) type of track grouping, wherein a TrackGroupTypeBox may be defined according to ISOBMFF and may contain a single track_group_id field. According to embodiments, a syntax for a PCCGroupBox is as follows:

```
aligned(8) class PCCGroupBox extends TrackGroupTypeBox('pccs') {
}.
```

According to embodiments, tracks belonging to a same PCC stream may have a same (e.g., a same value for) track_group_id for track_group_type 'pccs', and tracks belonging to different PCC stream may have different/respective track_group_ids. According to embodiments, a PCC stream may be identified according to a track_group_id within a TrackGroupTypeBox having track_group_type equal to 'pccs'.

According to embodiments, a PCCHeaderBox may be used to indicate operation points and a global header of each PCC stream, for example, in a case where multiple point cloud streams are included (e.g., allowed) in a single container. According to embodiments, a syntax of PCCHeaderBox may be as follows:

```
aligned(8) class PCCHeaderBox extends Box {
    unsigned int(8) number_of_pcc_streams;
    for (i=0; i<num_of_pcc_streams; i++) {
        unsigned int(8) pcc_stream_id;
        PCCHeaderStruct( );
    }
}.
```

According to embodiments, semantics of the above identified fields may be: (1) number of pcc_streams may indicate how many point cloud streams may be stored in a file; and (2) pcc_stream_id may be a unique identifier for each point cloud stream corresponding to a track_group_id for tracks of component streams.

Signaling PCC Profiles

In order to implement media coding standards in an interoperable way, for example, across various applications that have similar functional requirements, profiles, tiers, and levels may be used as (e.g., may specify) conformance points. A profile may define a set of coding tools and/or algorithms used in generating a (e.g., conforming) bitstream, and a level may define (e.g., may place) constraints on (e.g., certain, key, etc.) parameters of a bitstream, such as, for example, parameters corresponding to any of decoder processing load, memory capabilities, or similar.

According to embodiments, brands may be used to indicate conformance to V-PCC profiles, for example, by indicating brands in a track-specific manner. ISOBMFF includes a concept of brands, which may be indicated using a compatible_brands list in a FileTypeBox. Each brand is a four-character code, registered with ISO, that identifies a precise specification. The presence of a brand in the compatible_brands list of the FileTypeBox may be used to indicate that a file conforms to requirements of that brand. Similarly, a TrackTypeBox (e.g., inside the TrackBox) may be used to indicate conformance of an individual track to a certain brand. According to embodiments, brands may be used to indicate conformance to V-PCC profiles, for example, because a TrackTypeBox may have a syntax that is similar or identical to that of FileTypeBox and may be used to indicate brands in a track-specific manner. According to embodiments, V-PCC profiles may also be signaled as part of a PCCHeaderBox. According to embodiments, V-PCC profiles may also be signaled in a VPCCContentBox, for example, as defined above with reference to a single point of entry for point cloud data in a container file.

VPCC Parameter Set Reference

As discussed above, certain parameter set reference structures designed for VPCC_PSD may be problematic.

Figure 10:
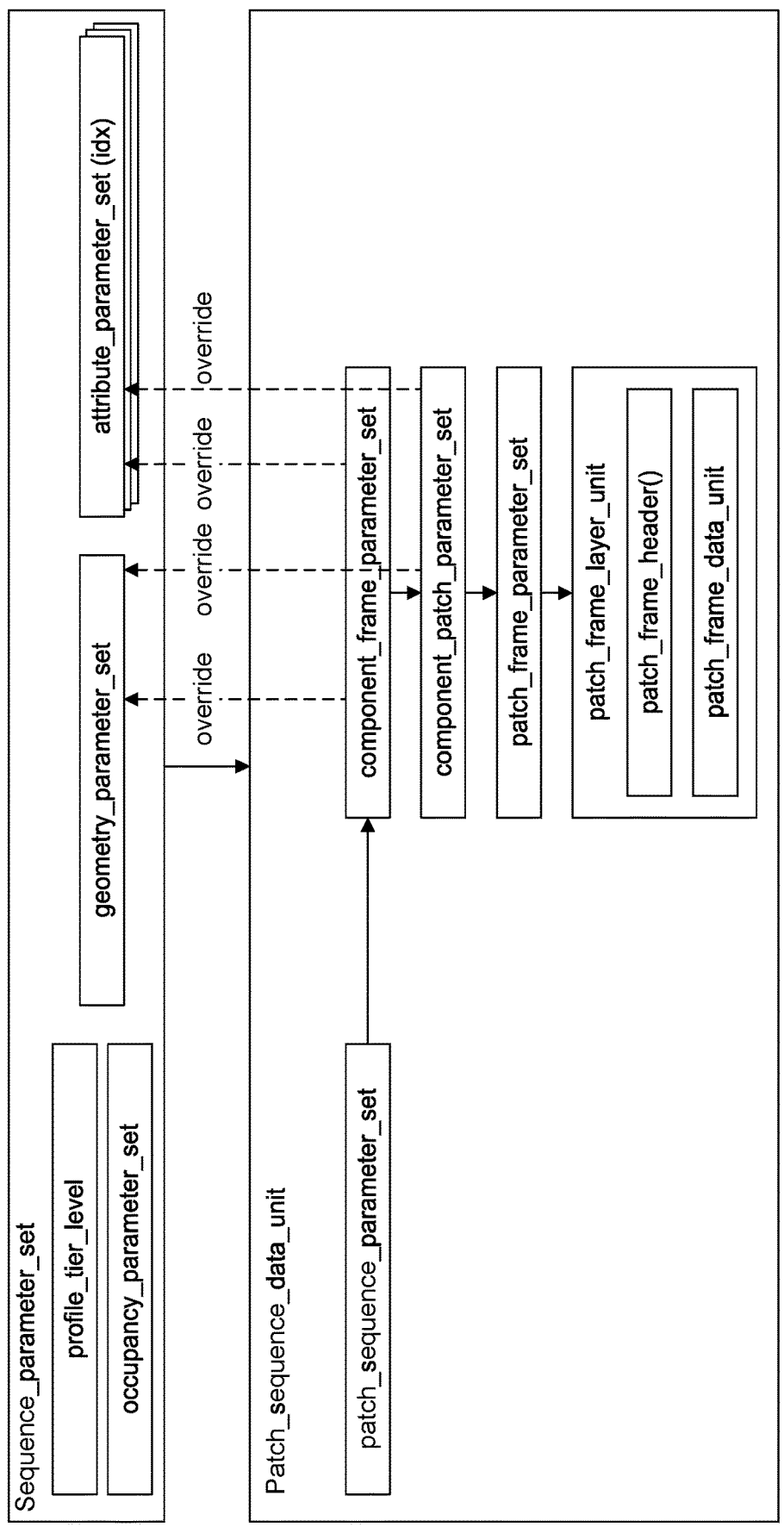
FIG. 10 is a diagram illustrating a PSD parameter sets reference structure according to embodiments.

FIG. 10 is a diagram illustrating a PSD parameter sets reference structure according to embodiments.

According to embodiments, for example, in contrast to the problematic structures, parameters of a frame level geometry parameter set and an attribute parameter set may be integrated into a single component parameter set. According to embodiments, such single component parameter set may refer to a single active patch sequence parameter set, and integrate parameters of a geometry patch parameter set and an attribute patch parameter set into a single component patch parameter set which refers to an active geometry attribute frame parameter set. According to embodiments, a patch frame parameter set may refer to a single active geometry attribute patch parameter set. A proposed PSD parameter set reference structure is shown in FIG. 10.

Figure 11:
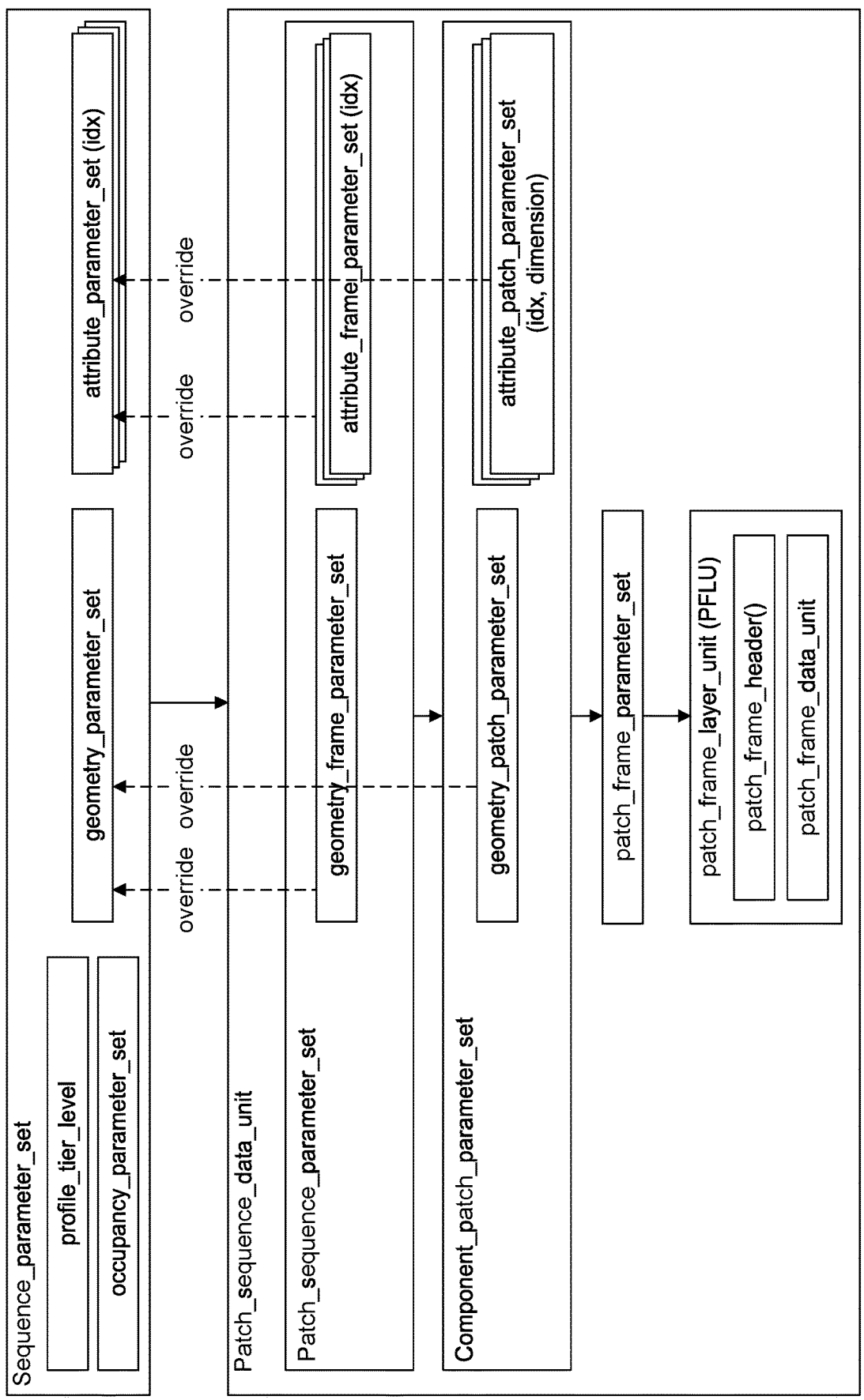
FIG. 11 is a diagram illustrating another PSD parameter sets reference structure according to embodiments.

FIG. 11 is a diagram illustrating another PSD parameter sets reference structure according to embodiments.

According to embodiments, parameters of any of a geometry frame parameter set and an attribute frame parameter set may be included in a patch sequence parameter set. That is, the parameters of geometry patch parameter set and the attribute patch parameter set may be combined to form a component_patch_parameter_set. According to embodiments, the component_patch_parameter_set may refer to an active patch sequence parameter set. According to embodiments, as shown in FIG. 11, a patch frame parameter set may refer to an active component patch parameter set.

Supporting Spatial Access and Signaling Regions of Interest

A region-of-interest (RoI) in a point cloud may be defined by a 3D bounding box. According to embodiments, patches, for example, resulting from the projection of points within the RoI, may be packed to a set of tiles in the 2D frames of any of the geometry, occupancy, and attribute components. According to embodiments, the tiles (e.g., a set of tiles in a 2D frame) may be encoded with a higher quality/resolution, and the tiles may (e.g., then) be independently coded. For example, the tile may be independently coded as HEVC MCTS tiles, and their respective samples may be stored in separate ISOBMFF tracks. Such may allow for (e.g., facilitate) spatial random access to the RoI, for example, without having to decode the entire 2D frame.

According to embodiments, corresponding 2D tile tracks, for example, from across (e.g., among) the point cloud's components, may be grouped together, for example, using a track grouping tool (e.g., as discussed above). According to embodiments, a TrackGroupBox ('trgr') may be added to the TrackBox associated with (e.g., of all) component tracks. A new type of track grouping for 2D tile tracks of V-PCC component tracks may have a TrackGroupTypeBox (e.g., as defined according to ISO/IEC) and may contain a single track_group_id field, according to embodiments. The new type of track grouping may be defined as:

```
aligned(8) class VPCC2DTileGroupBox extends TrackGroupTypeBox
('p2dt') {
}.
```

According to embodiments, tracks belonging to the same point cloud 2D tile may have the same value of track_group_id for track_group_type 'p2dt'. According to embodiments, the track_group_id of tracks associated with a point cloud 2D tile may differ from the track_group_id of tracks associated with another (e.g., any other) point cloud 2D tile. The track_group_id within TrackGroupTypeBox with track_group_type equal to 'p2dt' may be used as the identifier of the point cloud 2D tile.

According to embodiments, a 3D RoI in a point cloud may be associated with any number of point cloud 2D tiles, for example, using a VPCCRegionsOfInterestBox. According to embodiments, a VPCCRegionsOfInterestBox may be defined as:

```
aligned(8) class 3DRegionBox extends FullBox('3drg',0,0) {
   unsigned int(16) region_x;
   unsigned int(16) region_y;
      unsigned int(16) region_z;
      unsigned int(16) region_width;
      unsigned int(16) region_height;
      unsigned int(16) region_depth;
}
aligned(8) class VPCCRegionsOfInterestBox extends FullBox('vpri',0,0) {
   unsigned int(8) roi_count;
   for (i=0; i<roi_count; i++) {
      3DRegionBox( );
      unsigned int(8) 2d_tile_count;
      unsigned int(32) track_group_ids[ ];
   }
}.
```

According to embodiments, semantics for fields of a 3DRegionBox and/or a VPCCRegionsOfInterestBox may include any of: (1) region_x may be an x-coordinate of the reference point of the bounding box; (2) region_y may be a y-coordinate of the reference point of the bounding box; (3) region_z may be a z-coordinate of the reference point of the bounding box; (4) region_width may indicate a length of the bounding box along the x-axis; (5) region_height may indicate a length of the bounding box along the y-axis; (6) region_depth may indicate a length of the bounding box along the z-axis; (7) roi_count may indicate a number of RoIs in the point cloud; (8) 2d_tile_count may indicate a number of point cloud 2D tiles associated with the RoI; and (9) track_group_ids may be an array of track group identifiers for track groups of the type 'p2dt' (e.g., corresponding to point cloud 2D tiles).

According to embodiments, in a case where RoIs in a point cloud sequence are static (e.g., do not change), the VPCCRegionsOfInterestBox may be included in any of the VPCCSampleEntry in the PCC metadata track or the VPCC-ContentGroupingBox in the MetaBox. According to embodiments, in a case where RoIs in a point cloud sequence are dynamic, the VPCCRegionsOfInterestBox may be signaled in samples of the PCC metadata track.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of (or interchangeable with) any UE or mobile device recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of conveying decoding information for a point cloud (PC) bitstream of coded PC sequences, the method comprising:
    mapping a metadata component bitstream of the PC bitstream into a first restricted video track of an International Organization for Standardization/International Electrotechnical Commission Base Media File Format (ISOBMFF), wherein the first restricted video track of the ISOBMFF comprises one or more access units of the metadata component bitstream;
    mapping a geometry sub-bitstream of the PC bitstream into a second restricted video track of the ISOBMFF, wherein the second restricted video track of the ISOBMFF comprises one or more access units of the geometry sub-bitstream;

mapping an occupancy sub-bitstream of the PC bitstream into a third restricted video track of the ISOBMFF, wherein the third restricted video track of the ISOBMFF comprises one or more access units of the occupancy sub-bitstream, wherein the first restricted video track comprises indications of one or more component bitstreams of the PC bitstream that are encoded in the ISOBMFF, and wherein the one or more component bitstreams of the PC bitstream include the geometry sub-bitstream and the occupancy sub-bitstream;

adding a restricted scheme information box to the first restricted video track, the second restricted video track, and the third restricted video track, the restricted scheme information box indicating that the respective video track is a restricted video track; and generating an ISOBMFF container to transmit the metadata component bitstream mapping, the geometry sub-bitstream mapping, and the occupancy sub-bitstream mapping for the PC bitstream.

2. The method of claim 1, wherein the
first restricted video track comprises a plurality of samples associated with the metadata component bitstream of the PC bitstream, the second restricted video track comprises a plurality of second samples associated with the geometry sub-stream of the PC bitstream, and the third restricted video track comprises a plurality of third samples associated with the occupancy sub-bitstream of the PC bitstream.

3. The method of claim 1, wherein the second restricted video track and the third restricted video track comprise an indication of one or more layers of the PC bitstream.

4. The method of claim 3, wherein each of the one or more layers is associated with a respective depth with respect to a depth image plane.

5. The method of claim 1, further comprising mapping an attribute sub-bitstream of the PC bitstream into a fourth restricted video track of the ISOBMFF, wherein the fourth restricted video track of the ISOBMFF comprises one or more access units of the attribute sub-bitstream.

6. The method of claim 1, wherein the first restricted video track, the second restricted video track, and the third restricted video track in one coded PC sequence are signaled in a single location of the ISOBMFF.

7. The method of claim 5, wherein the attribute sub-stream is associated with an attribute type that comprises a color, a transparency, a time of acquisition, or another material property.

8. The method of claim 1, wherein the metadata component bitstream comprises one or more of PC header information and global header information.

9. The method of claim 1, further comprising generating one or more timed-metadata component bitstreams, wherein samples associated with the timed-metadata component bitstreams are included in a MediaDataBox.

10. The method of claim 1, wherein an ISOBMFF track reference tool is used to link the metadata component bitstream of the PC bitstream to the first restricted video track, the second restricted video track, and the third restricted video track.

11. An apparatus comprising circuitry for conveying decoding information for a point cloud (PC) bitstream of coded PC sequences, the circuitry including any of a transmitter, a receiver, a processor and memory, configured to:
map a metadata component bitstream of the PC bitstream into a first restricted video track of an International Organization for Standardization/International Electrotechnical Commission Base Media File Format (ISOBMFF), wherein the first restricted video track of the ISOBMFF comprises one or more access units of the metadata component bitstream;

map a geometry sub-bitstream of the PC bitstream into a second restricted video track of the ISOBMFF, wherein the second restricted video track of the ISOBMFF comprises one or more access units of the geometry sub-bitstream;

map an occupancy sub-bitstream of the PC bitstream into a third restricted video track of the ISOBMFF, wherein the third restricted video track of the ISOBMFF comprises one or more access units of the occupancy sub-bitstream, wherein the first restricted video track comprises indications of one or more component bitstreams of the PC bitstream that are encoded in the ISOBMFF, and wherein the one or more component bitstreams of the PC bitstream include the geometry sub-bitstream and the occupancy sub-bitstream;

add a restricted scheme information box to the first restricted video track, the second restricted video track, and the third restricted video track, the restricted scheme information box indicating that the respective video track is a restricted video track; and generate an ISOBMFF container to transmit the metadata component bitstream mapping, the geometry sub-bitstream mapping, and the occupancy sub-bitstream mapping for the PC bitstream.

12. The apparatus of claim 11, wherein the
first restricted video track comprises a plurality of samples associated with the metadata component bitstream of the PC bitstream, the second restricted video track comprises a plurality of second samples associated with the geometry sub-stream of the PC bitstream, and the third restricted video track comprises a plurality of third samples associated with the occupancy sub-bitstream of the PC bitstream, and wherein the second restricted video track and the third restricted video track comprise an indication of one or more layers of the PC bitstream.

13. The apparatus of claim 12, wherein each of the one or more layers is associated with a respective depth with respect to a depth image plane.

14. The apparatus of claim 11, wherein the processor is further configured to map an attribute sub-bitstream of the PC bitstream into a fourth restricted video track of the ISOBMFF, wherein the fourth restricted video track of the ISOBMFF comprises one or more access units of the attribute sub-bitstream container.

15. The apparatus of claim 14, wherein the attribute sub-stream is associated with an attribute type that comprises a color, a transparency, a time of acquisition, or another material property.

16. The apparatus of claim 11, wherein the processor is further configured to generate one or more timed-metadata component bitstreams, wherein samples associated with the timed-metadata component bitstreams are included in a MediaDataBox.

17. The apparatus of claim 11, wherein an ISOBMFF track reference tool is used to link the metadata component bitstream of the PC bitstream to the first restricted video track, the second restricted video track, and the third restricted video track.

18. The apparatus of claim 11, wherein the metadata component bitstream comprises one or more of PC header information and global header information.

19. The apparatus of claim 11, wherein the first restricted video track, the second restricted video track, and the third restricted video track in one coded PC sequence are signaled in a single location of the ISOBMFF.

* * * * *